(12) United States Patent
Yada et al.

(10) Patent No.: US 8,208,164 B2
(45) Date of Patent: *Jun. 26, 2012

(54) IMAGE PROCESSING APPARATUS AND METHOD

(75) Inventors: Junya Yada, Nagano-ken (JP); Takashi Kato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,790

(22) Filed: May 11, 2010

(65) Prior Publication Data

US 2010/0220367 A1 Sep. 2, 2010

Related U.S. Application Data

(63) Continuation of application No. 10/797,062, filed on Mar. 11, 2004, now Pat. No. 7,742,198, which is a continuation-in-part of application No. PCT/JP02/09328, filed on Sep. 12, 2002, and a continuation-in-part of application No. 10/489,244, filed on Mar. 11, 2004, now Pat. No. 7,059,785.

(30) Foreign Application Priority Data

Sep. 12, 2001 (JP) ................................. 2001-276543
Dec. 28, 2001 (JP) ................................. 2001-399255
Mar. 12, 2003 (JP) ................................. 2003-066271
Feb. 16, 2004 (JP) ................................. 2004-038890

(51) Int. Cl.
*G06F 3/12* (2006.01)

(52) U.S. Cl. ......... 358/1.15; 358/451; 358/1.9; 358/1.2; 347/102; 347/149; 400/619; 400/621; 399/367; 399/81

(58) Field of Classification Search ................. 358/1.15, 358/474, 1.2, 448, 497, 450, 451, 300, 1.9, 358/1.17, 1.18, 449; 382/289, 293, 297; 399/367, 81, 364, 368, 374, 373; 347/102, 347/6, 14, 30, 149; 400/619, 621, 62
See application file for complete search history.

(56) References Cited

U.S. PATENT DOCUMENTS 3,831,478 A * 8/1974 Wright et al. .................... 83/368
4,475,808 A 10/1984 Cartwright
(Continued)

FOREIGN PATENT DOCUMENTS

EP 1 059 168 A 12/2000
(Continued)

OTHER PUBLICATIONS

Japanese Office Action dated Jun. 28, 2011 issued in corresponding Japanese Patent Application No. 2008-115017.

(Continued)

*Primary Examiner* — Negussie Worku
(74) *Attorney, Agent, or Firm* — Sughrue Mion, PLLC

(57) ABSTRACT

An image scanner might capture an image corresponding to scan region 263 which might be somewhat larger than original 262. Image processing circuitry might then enlarge an image corresponding to scan region 263 (arrow 279), converting it into enlarged image 271. Within enlarged image 271, the image of original 262 might have been enlarged so as to become image 273, which might be somewhat larger than printing paper 274. This enlarged original image 273 which would be present within enlarged image 271 might then be printed by a printer. Four-sided borderless copying is possible.

7 Claims, 25 Drawing Sheets

U.S. PATENT DOCUMENTS

| | | | |
|---|---|---|---|
| 4,647,187 A | 3/1987 | Zahn et al. | |
| 4,727,431 A | 2/1988 | Nakamura et al. | |
| 4,734,785 A | 3/1988 | Takei et al. | |
| 4,745,443 A * | 5/1988 | Adachi et al. | 355/40 |
| 4,802,229 A * | 1/1989 | Yamada | 382/289 |
| 4,837,635 A | 6/1989 | Santos | |
| 4,839,699 A * | 6/1989 | Hosaka et al. | 355/55 |
| 4,847,662 A * | 7/1989 | Yamada | 355/55 |
| 4,870,500 A | 9/1989 | Nagashima | |
| 5,146,272 A * | 9/1992 | Watanabe | 399/53 |
| 5,289,210 A | 2/1994 | Takayanagi | |
| 5,497,217 A * | 3/1996 | Yoshida | 355/77 |
| 5,517,319 A * | 5/1996 | Arai | 358/300 |
| 5,600,412 A | 2/1997 | Connors | |
| 5,627,585 A | 5/1997 | Goldschmidt et al. | |
| 5,825,996 A | 10/1998 | Davis et al. | |
| 6,008,812 A | 12/1999 | Ueda et al. | |
| 6,204,494 B1 | 3/2001 | Chavez | |
| 6,414,755 B1 | 7/2002 | Bronstein et al. | |
| 6,456,402 B1 | 9/2002 | Motoyama | |
| 6,614,564 B1 | 9/2003 | Sakaguchi | |
| 6,765,691 B2 | 7/2004 | Kubo et al. | |
| 6,804,391 B1 | 10/2004 | Blake et al. | |
| 6,834,929 B1 * | 12/2004 | Adams et al. | 347/19 |
| 6,868,524 B1 | 3/2005 | Fushiki et al. | |
| 6,961,155 B2 * | 11/2005 | Sakaguchi | 358/475 |
| 6,964,466 B1 | 11/2005 | Kodama et al. | |
| 6,965,460 B1 | 11/2005 | Gann et al. | |
| 7,011,383 B2 | 3/2006 | Edwards et al. | |
| 7,034,956 B2 * | 4/2006 | Mochizuki | 358/1.2 |
| 7,059,785 B2 * | 6/2006 | Kato et al. | 400/62 |
| 7,077,499 B2 | 7/2006 | Kodama et al. | |
| 7,095,526 B1 | 8/2006 | Housel | |
| 7,131,782 B2 | 11/2006 | Jung | |
| 7,221,285 B1 | 5/2007 | Hamilton | |
| 7,255,434 B2 | 8/2007 | Kodama | |
| 7,296,886 B2 | 11/2007 | Kodama et al. | |
| 7,377,633 B2 | 5/2008 | Kodama et al. | |
| 7,401,916 B2 | 7/2008 | Kodama et al. | |
| 7,415,168 B2 | 8/2008 | Yamamoto | |
| 7,477,426 B2 * | 1/2009 | Guan et al. | 358/474 |
| 7,547,589 B2 * | 6/2009 | Iriguchi | 438/149 |
| 7,573,606 B2 * | 8/2009 | Nomoto et al. | 358/1.9 |
| 7,588,300 B2 * | 9/2009 | Koga et al. | 347/5 |
| 7,602,523 B2 * | 10/2009 | Kugo | 358/1.2 |
| 7,623,277 B2 | 11/2009 | Wang et al. | |
| 7,669,999 B2 | 3/2010 | Kodama et al. | |
| 7,854,503 B2 | 12/2010 | Kodama et al. | |
| 7,861,160 B2 * | 12/2010 | Ohno | 715/244 |
| 7,901,066 B2 | 3/2011 | Kodama et al. | |
| 7,961,347 B2 | 6/2011 | Kato et al. | |
| 2002/0140992 A1 * | 10/2002 | Konagaya | 358/461 |
| 2003/0164992 A1 * | 9/2003 | Sakaguchi | 358/475 |
| 2003/0215256 A1 * | 11/2003 | Osada | 399/81 |
| 2004/0028450 A1 | 2/2004 | Jung | |
| 2004/0207875 A1 * | 10/2004 | Endo | 358/1.18 |
| 2004/0247359 A1 * | 12/2004 | Koto et al. | 400/62 |
| 2005/0110860 A1 * | 5/2005 | Shiraishi | 347/129 |
| 2008/0018704 A1 | 1/2008 | Kodama et al. | |
| 2011/0058004 A1 | 3/2011 | Kodama et al. | |
| 2011/0058005 A1 | 3/2011 | Kodama et al. | |
| 2011/0141170 A1 | 6/2011 | Kodama et al. | |

FOREIGN PATENT DOCUMENTS

| | | |
|---|---|---|
| JP | 1-119870 A | 5/1989 |
| JP | 04-140958 A | 5/1992 |
| JP | 04337964 A | 11/1992 |
| JP | 5-176156 A | 7/1993 |
| JP | 06-064157 A | 3/1994 |
| JP | 60-64157 A | 3/1994 |
| JP | 07-199742 A | 8/1995 |
| JP | 11-69096 A | 3/1999 |
| JP | 11-231432 A | 8/1999 |
| JP | 11-298725 A | 10/1999 |
| JP | 2000-103061 A | 4/2000 |
| JP | 2000-184145 A | 6/2000 |
| JP | 2000184218 A | 6/2000 |
| JP | 2000-218887 A | 8/2000 |
| JP | 2000-244691 A | 9/2000 |
| JP | 2001-218025 A | 8/2001 |
| JP | 2001-219553 A | 8/2001 |
| JP | 2003-53953 A | 2/2003 |
| JP | 2004-15122 A | 1/2004 |

OTHER PUBLICATIONS

Japanese Office Action dated Jun. 28, 2011 issued in corresponding Japanese Patent Application No. 2008-303472.
Final Office Action for U.S. Appl. No. 12/263,072 dated Oct. 14, 2011.
Japanese Patent Office Action dated Jan. 18, 2012.
Non-Final Office Action for U.S. Appl. No. 13/102,543 dated Jan. 18, 2012.

* cited by examiner

IMAGE PROCESSING APPARATUS AND METHOD

CROSS-REFERENCE TO RELATED APPLICATIONS

This is a continuation of application Ser. No. 10/797,062 filed Mar. 11, 2004 which is a continuation-in-part application claiming benefit of domestic priority to International (WO) Application No. PCT/JP02/09328, filed Sep. 12, 2002, entitled "Composite Printer and Scan Image Copying Method," the content of which is incorporated herein by reference in its entirety and which entered U.S. national stage on Mar. 11, 2004; this application furthermore claims benefit of foreign priority to Japanese (JP) Patent Application No. 2001-276543, filed Sep. 12, 2001, the content of which is incorporated herein by reference in its entirety; and this application furthermore claims benefit of foreign priority to Japanese (JP) Patent Application No. 2001-399255, filed Dec. 28, 2001, the content of which is incorporated herein by reference in its entirety. Further, this application claims benefit of foreign priority to Japanese (JP) Patent Application No. 2003-066271, filed Mar. 12, 2003, the content of which is incorporated herein by reference in its entirety, and furthermore claims benefit of foreign priority to Japanese (JP) Patent Application No. 2004-038890, filed Feb. 16, 2004, the content of which is incorporated herein by reference in its entirety.

FIELD OF ART

The present invention pertains to an image processing apparatus and method; and in particular, pertains to image processing technology suited to a copy apparatus or a hybrid printer for carrying out scanning of images and printing of scanned images.

BACKGROUND ART

In recent years, depending upon the printer in question, it has in some cases become possible to carry out what is called four-sided borderless printing—in which printing is carried out over the entirety of the printed surface of the printing paper (i.e., so as to avoid leaving unprinted margin-like regions at the four sides—or top, bottom, left, and right—thereof)—of images based on data subject to printing (see, e.g., Japanese Patent Application Publication Kokai No. 2003-053953). In accordance with such art, it is also possible to print to the full horizontal extent (i.e., so as to avoid leaving unprinted margin-like regions at the two sides—or left and right—thereof) of printing paper which is long vertically such as is the case with roll paper (such printing being hereinafter referred to as "two-sided borderless printing"). Furthermore, also appearing on the scene are hybrid printers in which scanner capabilities have been added such that images captured by means of scanner mechanisms can be directly printed onto printing paper by means of printer mechanisms (see, e.g., Japanese Patent Application Publication Kokai No. 2001-218025).

It has been the case with such hybrid printers, when printing is carried out as a result of instruction to cause printer mechanism to directly perform four-sided borderless printing of image captured from original by scanner mechanism onto printing paper identical in size to original, that, because scan region capable of being captured by scan mechanism is smaller than entire original surface region by amount corresponding to prescribed margins (hereinafter "scanner margins"), such scanner margins appear in unabated fashion on printing paper, making it impossible to obtain satisfactory print results. Improvement of mechanical precision in connection with both scanning and printing in order to adjust such discrepancy between scan region of scanner mechanism and print region of printer mechanism has been a problem from the standpoint of product cost. Particularly with respect to the aforementioned hybrid printers, because individual users represent the primary target of sales activities, there is a strong desire to keep product costs to a minimum.

DISCLOSURE OF INVENTION

It is therefore an object of the present invention to provide image processing technology for making it possible in the context of hybrid printer to carry out four-, three-, two- or one-sided borderless printing without occurrence of margin region even when image captured by scanner mechanism is printed by printer mechanism.

An image processing apparatus in accordance with one aspect of the present invention comprises an original stage; a scanner establishing at least one scan region at the original stage, scanning the scan region established at the original stage, and outputting image data corresponding to the scan region; an image processor accepting input of image data, processing the input image data, and outputting the processed image data; and a controller controlling the scanner and the processor, and carrying out operations in accordance with any of one or more operational modes including a first operational mode; wherein the controller, when carrying out operations in accordance with the first operational mode, controls the scanner so as to cause the scanner to establish the scan region such that the scan region matches or is larger than a copy subject region at the original stage and such that the copy subject region is encompassed by the scan region; and controls the image processor so as to cause the image processor to accept input of image data corresponding to the scan region output from the scanner and to output enlarged image data obtained by enlarging, so as to be larger than a dimension or dimensions of a print medium in either a horizontal direction or a vertical direction or in both a horizontal direction and a vertical direction, image data corresponding to the copy subject region that is encompassed by image data corresponding to the scan region.

One embodiment of this image processing apparatus further comprises a printer using image data output by the image processor to carry out printing at the print medium.

In one embodiment, the controller may assume existence of a region corresponding to an original placed on the original stage based on a previously specified original size, and may deem that the assumed region corresponding to the original is to be the copy subject region.

In one embodiment, the controller may detect a region corresponding to an original placed on the original stage through use of the scanner, and may deem that the detected region corresponding to the original is to be the copy subject region.

In one embodiment, an arbitrary region at the original stage may be specified by a user, and the controller may deem that the region specified by the user is to be the copy subject region.

In one embodiment, the controller may detect a copy subject discernible within an original placed on the original stage through use of the scanner, may establish a region encompassing the detected copy subject, and may deem that the established region is to be the copy subject region.

In one embodiment, the scanner may prescan the original stage prior to scanning of the scan region and may output prescan image data corresponding to the original stage; and the controller may detect a region corresponding to the original based on the original stage prescan image data.

In one embodiment, the scanner may prescan the original stage prior to scanning of the scan region and may output prescan image data corresponding to the original stage; and the controller may detect the copy subject based on the original stage prescan image data.

In one embodiment, the controller may control the printer so as to cause a positional relationship of a print start location relative to the print medium to vary in correspondence to a magnification employed when the image processor enlarges image data corresponding to the copy subject region.

One embodiment of this image processing apparatus may further comprise image input circuitry accepting input of image data from an image-containing-data source other than the scanner; wherein the one or more operational modes include a second operational mode; and the controller, when carrying out operations in accordance with the second operational mode, controls the image processor so as to cause the image processor to output enlarged image data obtained by enlarging, so as to be larger than a size of the print medium, a region subject to printing that is within image data input from the image-containing-data source by the image input circuitry.

One embodiment of this image processing apparatus may further comprise image input circuitry accepting input of image data from an image-containing-data source other than the scanner; wherein the one or more operational modes include a third operational mode; and the controller, when carrying out operations in accordance with the third operational mode, controls the image processor so as to cause the image processor to create superposed image data by superposing a region subject to printing in image data from the image-containing-data source input by the image input circuitry and image data corresponding to the copy subject region that is encompassed by image data corresponding to the scan region which is output from the scanner, and so as to cause the image processor to output the superposed image data.

An image processing apparatus in accordance with another aspect of the present invention comprises an original stage; a scanner establishing at least one scan region at the original stage, scanning the scan region established at the original stage, and outputting image data corresponding to the scan region; an image processor accepting input of image data, carrying out processing on the input image data, and outputting processed image data; and a controller controlling the scanner and the processor, and carrying out operations in accordance with any of one or more operational modes including a first operational mode; wherein the controller, when carrying out operations in accordance with the first operational mode, controls the scanner so as to cause the scanner to establish the scan region such that the scan region is smaller than a copy subject region at the original stage and such that the scan region is encompassed by the copy subject region; and controls the image processor so as to cause the image processor to accept input of image data corresponding to the scan region and output by the scanner, and to output enlarged image data obtained by enlarging, so as to be larger than a size of the print medium, image data corresponding to the scan region.

One embodiment of this image processing apparatus further comprises a printer using image data output by the image processor to carry out printing at the print medium.

In one embodiment, the controller may cause the scan region to be established such that the scan region is smaller by a prescribed scanner margin than the copy subject region; the image processor may enlarge image data corresponding to the scan region so as to cause the enlarged image data corresponding to the scan region to be larger by a prescribed printer margin than the print medium in either a horizontal direction or a vertical direction or in both a horizontal direction and a vertical direction; and the scanner margin may be smaller than the printer margin.

An image processing apparatus in accordance with yet another aspect of the present invention comprises an original stage; a scanner scanning at least one scan region at the original stage and outputting image data corresponding to the scan region; an image processor processing image data corresponding to the scan region from the scanner, creating print image data, and outputting the print image data; and a controller selecting any mode from among at least two of a plurality of varieties of copy modes including a normal copy mode, a borderless copy mode, and a unity magnification copy mode, and controlling the image processor in correspondence to the selected mode; wherein the controller (1) when the normal copy mode is selected: controls the image processor so as to cause the print image data to be smaller than dimensions of the print medium in both a horizontal direction and a vertical direction; (2) when the borderless copy mode is selected: controls the image processor so as to cause the print image data to be larger than a dimension or dimensions of the print medium in either a horizontal direction or a vertical direction or in both a horizontal direction and a vertical direction; and (3) when the unity magnification copy mode is selected: controls the image processor so as to cause a size of the print image data to be the same as a size of image data corresponding to the scan region.

The present invention also provides an image processing method such as may be carried out by the foregoing image processing apparatus.

The present invention, moreover, also provides a method, such as may be carried out by the foregoing image processing apparatus, of controlling scanner circuitry and image processing circuitry.

The present invention, furthermore, provides a computer program for causing a computer to carry out the foregoing control method.

BEST MODE FOR CARRYING OUT INVENTION

Next, embodiments of the present invention will be described with reference to the drawings.

Figure 1:
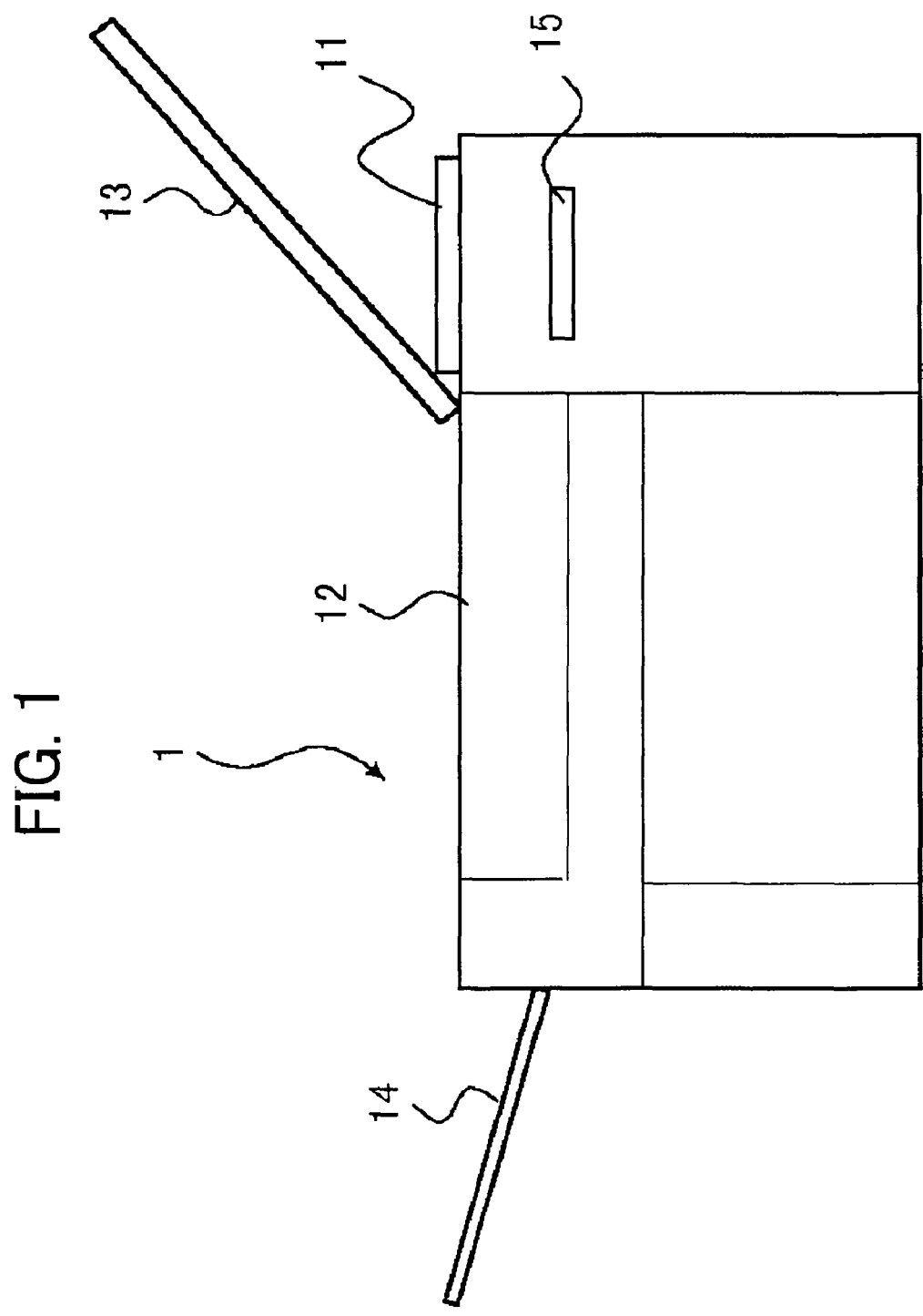
FIG. 1 is a drawing showing the external appearance of a hybrid printer associated with a first embodiment of the present invention.

FIG. 1 is a drawing showing the external appearance of a hybrid printer associated with a first embodiment of the present invention. This hybrid printer 1 has scanner functionality by which it captures document(s) or other such original(s) in the form of scan image data, and has printer functionality by which it converts scan image data, application data, and/or other such data subject to printing into print image data and carries out printing on printing paper. Provided at the interior of hybrid printer 1 there is/are control apparatus(es), control being carried out in comprehensive fashion by such control apparatus(es) and various functions being implemented thereby.

As shown in same drawing, provided at the top of the main body of hybrid printer 1 there are liquid crystal panel(s) and various buttons forming user interface(s) 11. User(s) can, by way of this user interface 11, scan original(s), give print instructions, enter various settings related to conditions in connection with scan, settings related to printing conditions, and so forth.

Furthermore, provided at the top of the main body of hybrid printer 1 there are original stage(s) 12, having glass surface(s) for placement of original(s), and cover(s) 13. While not shown in the drawing, provided beneath original stage(s) 12 there are light source(s) for irradiating, with light, original(s) placed on glass surface(s) of original stage(s) 12, and optical sensor(s) receiving such light after it is reflected. Upon accepting image scan instruction(s) and/or printing instruction(s) from user(s) by way of user interface(s) 11, hybrid printer 1 captures original(s) placed on original stage(s) 12 in the form of scan image data which is stored in prescribed data format(s) in internal memory or memories. Hybrid printer 1 then carries out printing on printing paper based on scan image data stored in memory or memories. Following printing, hybrid printer 1 discharges printing paper into discharge tray 14.

Furthermore, provided at the front of the main body of hybrid printer 1 there are card slot(s) 15 serving as external interface(s). Card slot(s) 15 might, for example, conform to PCMCIA specification(s), and might be constructed so as to permit insertion and removal of memory card(s) (not shown) conforming to such specification(s). When a memory card is, for example, inserted in card slot 15 and presence thereof has been detected, hybrid printer 1 might display a message at liquid crystal panel(s) soliciting instruction(s) for execution of printing. In response thereto, a user might perform operations for setting of printing conditions as necessary (or not) and might give print instruction(s). Hybrid printer 1, upon accepting print instruction(s) from user(s), would read image-containing data recorded on memory card(s) and carry out printing on printing paper. Following printing, hybrid printer 1 would discharge printing paper into discharge tray 14.

Figure 2:
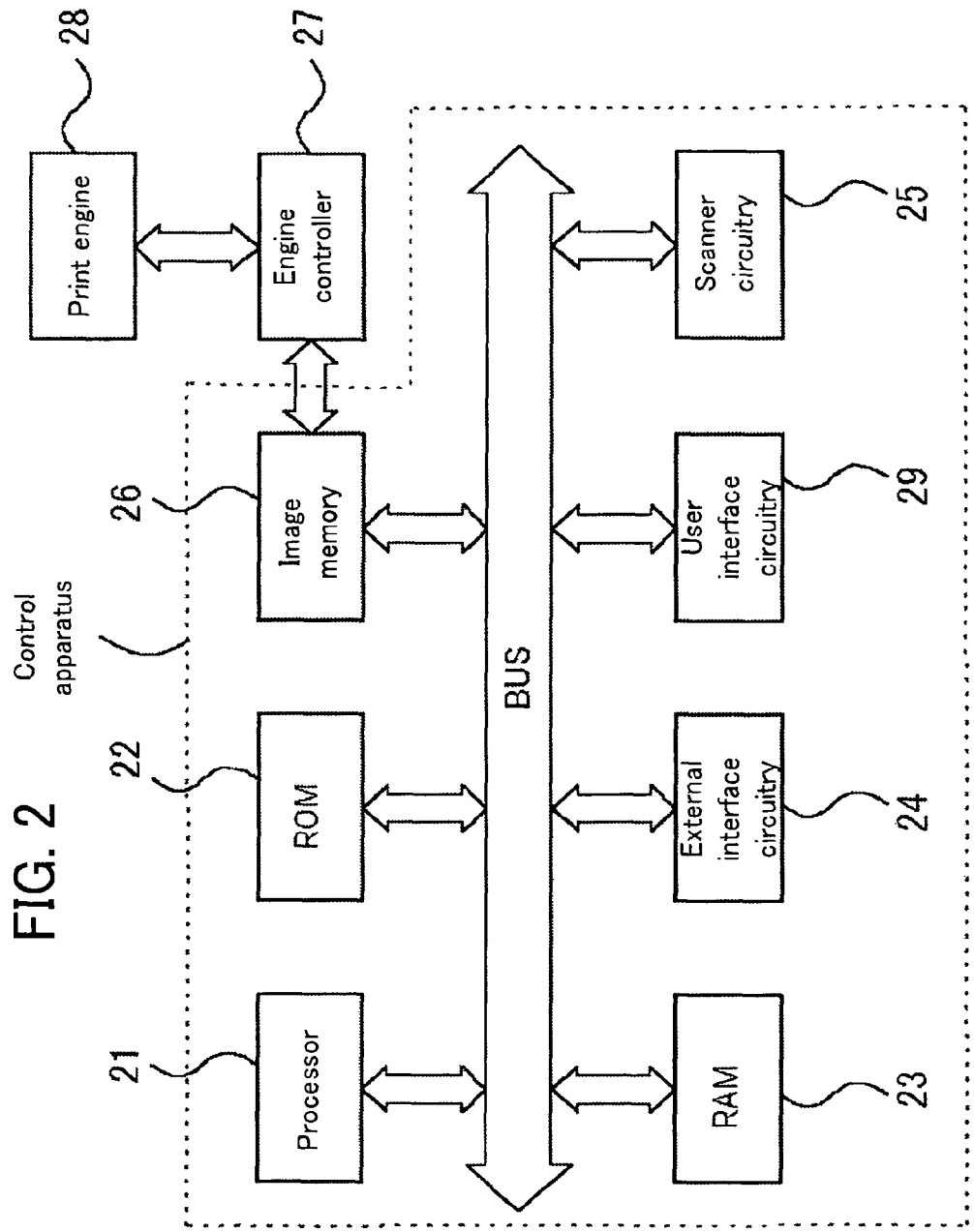
FIG. 2 is a block diagram showing the hardware configuration of hybrid printer 1 associated with the first embodiment.

FIG. 2 is a block diagram showing the hardware configuration of hybrid printer 1 associated with the present embodiment. Processor(s) 21 execute various control programs. That is, execution by processor(s) 21 of various programs stored in ROM(s) 22 causes prescribed functionality or functionalities of hybrid printer 1 to be implemented in conjunction with other hardware. In the present embodiment, at least user interface functionality, scanner functionality, image creation functionality, print control functionality, and the like are implemented.

External interface circuitry 24 is for making it possible for processor(s) 21 to access memory card(s) present in card slot(s) 15. After image-containing data stored on memory card(s) is loaded into RAM(s) 23 by way of this external interface circuitry 24, processor(s) 21 create print image data based on the loaded image-containing data in accordance with any printing conditions which may have been set.

Scanner circuitry 25 is for scanning original(s) placed on original stage(s) 12 and capturing same in the form of scan image data. After scan image data captured by this scanner circuitry 25 is loaded into RAM(s) 23, processor(s) 21 create print image data based on scan image data in accordance with any printing conditions which may have been set. Scanner circuitry 25 employed may be such as will accommodate image input technique(s) (reducing-type optical technique(s) in which lens(es) are used to scan reduced image(s) of original(s), contact-type optical technique(s) in which CCD(s) as wide as original(s) are used to scan original(s) at unity magnification, etc.). Furthermore, scanner circuitry 25 employed may be such as will accommodate prescribed method(s) for scanning of original color information (method(s) involving combination of monochromatic CCD(s) and color filter(s), method(s) employing color linear CCD(s) which themselves have color separating capability, etc.).

Image memory or memories 26 are for storing print image data which has been created. Engine controller(s) 27 control operation of print engine(s) 28, and at the same time, read print image data stored in image memory or memories 26 and supply same to print engine(s) 28. Activation of engine controller(s) 27 might, for example, be triggered by command(s) to execute printing sent from processor(s) 21 at time(s) when print image data of a prescribed width of band have been expanded, the expanded data being written to image memory or memories 26.

Print engine(s) 28—comprising, for example, paper feed mechanism(s), printhead(s), and so forth—are for carrying out printing on paper or other such print medium or media. Print engine(s) 28 employed may be such as will accommodate use in such types of printers as laser printers, serial printers, and/or the like.

User interface circuitry 29 is for controlling user interface 111, which is implemented by means of liquid crystal panel (s) and various buttons.

Figure 3:
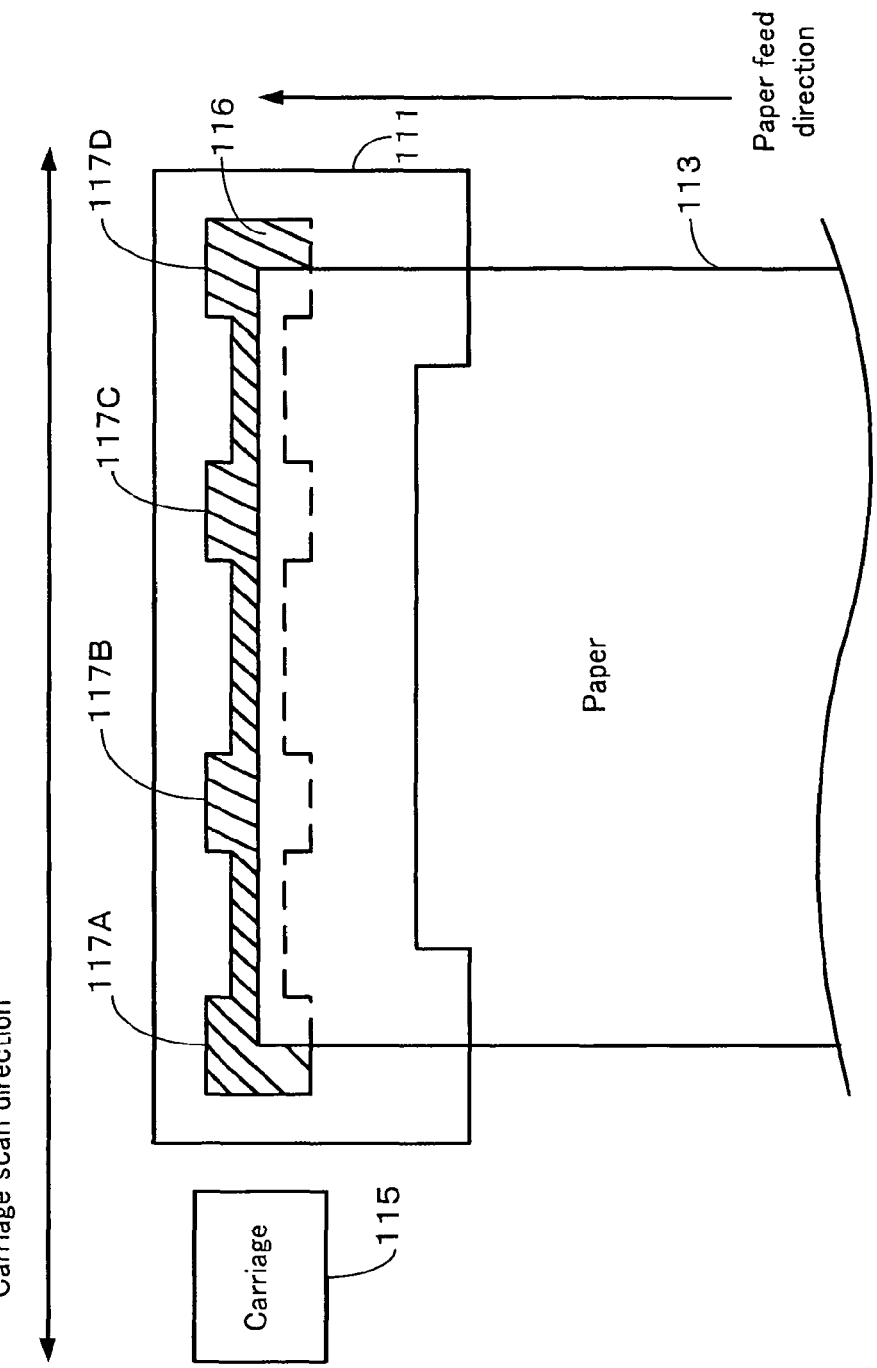
FIG. 3 is a drawing showing characteristic portions associated with borderless printing.

FIG. 3 is a drawing showing, in schematic fashion, characteristic portions of a print mechanism accommodating borderless printing such as might be provided at print engine 28.

Provided in the discharge path of paper 113 which is fed by paper feed mechanism(s) within hybrid printer 1 is/are platen (s) 111 supporting paper 113 from the side thereof opposite the side thereof which receives the jetted ink. Embedded within platen(s) 111, at location(s) facing path(s) of travel of carriage(s) 115, is/are ink absorber(s) 116 for absorbing ink jetted from printhead(s) in carriage(s) 115.

Ink absorber 116—being, for example, urethane resin—is long in a direction parallel to the direction of travel of carriage 115 and is of constant width in a direction parallel to the paper feed direction. This being the case, even if ink is jetted above the top edge or below the bottom edge of paper 113 in accompaniment to reciprocating travel of carriage 115, because such ink will be received by and absorbed by ink absorber 116, platen 111 will not be soiled by ink jetted beyond the edges of paper 113.

Furthermore, at ink absorber 116, left edge portion 117A, right edge portion 117D, and prescribed portions 117B and 117C therebetween, are widened (i.e., elongated) in the paper feed direction and in the direction opposite thereto. This being the case, even if ink is jetted to the left of the left edge or to the right of the right edge of paper 113 in accompaniment to reciprocating travel of carriage 115, because such ink will be received by and absorbed by ink absorber 116, platen 111 will not be soiled by ink jetted beyond the edges of paper 113. Moreover, the widened portion(s) are only specific portions 117A through 117D of ink absorber 116. The locations at such specific portions 117A through 117D in the direction of travel of the carriage respectively correspond to a plurality of paper sizes for which it is respectively possible to carry out borderless printing without soiling of platen 111. The paper size(s) for which it is possible to carry out borderless printing without soiling of platen 111 may be all of the plurality of paper sizes which hybrid printer 1 is capable of accommodating; or alternatively, may be limited to specific size(s) representing some subset thereof, e.g., standard A4 size (210 mm×297 mm), B5 size (182 mm×257 mm), and the Japanese postcard size (100 mm×148 mm). If the size of paper 113 is, for example, A4 size, ink absorber 116 would absorb ink jetted beyond the left edge and right edge of paper 113 at portions 117A and 117D; if the size of paper 113 is, for example, B5 size, ink absorber 116 would absorb ink jetted beyond the left edge and right edge of paper 113 at portions 117B and 117D; and if the size of paper 113 is, for example, Japanese postcard size, ink absorber 116 would absorb ink jetted beyond the left edge and right edge of paper 113 at portions 117C and 117D.

In accordance with a constitution such as the foregoing, soiling of platen 111 by ink jetted beyond paper 113 does not occur even when borderless printing is carried out (note that more specific detail with respect to the constitution described with reference to FIG. 3 can be found in the specifications and drawings attached to patent applications previously filed by the present applicant (Japanese Patent Application Nos. 2000-275965 and 2000-295861). Borderless printing may be carried out responsive to user request when in hybrid printer mode(s) and/or printer mode(s), described below.

In the present embodiment, printing may be carried out with print magnification being adjusted during creation of print image data based on scan image data captured under the control of scanner circuitry 25 in such manner as to cause printed image(s) to be enlarged relative to original image(s) by amount(s) such as would not appear visually strange to user(s).

Print magnification(s) (i.e., enlarging magnification(s) applied to scan image data in order to create print image data) may be adjusted as follows in correspondence to dimensional and/or positional relationship(s) between original(s) on original stage(s) and scan region(s) scanned by scanner mechanism(s). For example, where scan region(s) is or are established so as to be size(s) matching and/or larger than original (s) and so as to encompass original(s) therewithin, print magnification(s) may be adjusted so as to cause size(s) of image(s) of original(s) encompassed by image(s) of scanned scan region(s) to correspond to printing paper size(s). Moreover, where scan region(s) is or are established so as to be size(s) smaller than region(s) inside perimeter(s) of original (s) and so as to be encompassed by original region(s), print magnification(s) may be adjusted so as to cause image(s) of scanned scan region(s) to correspond to printing paper size (s). Here, when it is said that image(s) of scan region(s) and/or original region(s) "correspond to printing paper size(s)," rather than meaning that image(s) of scan region(s) and/or original region(s) must necessarily perfectly match and be coextensive with printing paper, this means that image(s) of scan region(s) and/or original region(s) may preferably be enlarged so as to be slightly larger than printing paper size(s) such that outside edge portion(s) of image(s) of scan region(s) and/or original region(s) extend small distance(s) beyond outside edge boundary or boundaries of printing paper so as to accommodate error(s) in control of print position(s). Print magnification is defined based on the relationship between scan region(s) and actual original size(s), a print magnification of on the order of 104% to 106% being preferred, and a print magnification of on the order of 105% being still more preferred, so as to not appear strange to user(s).

Figure 4:
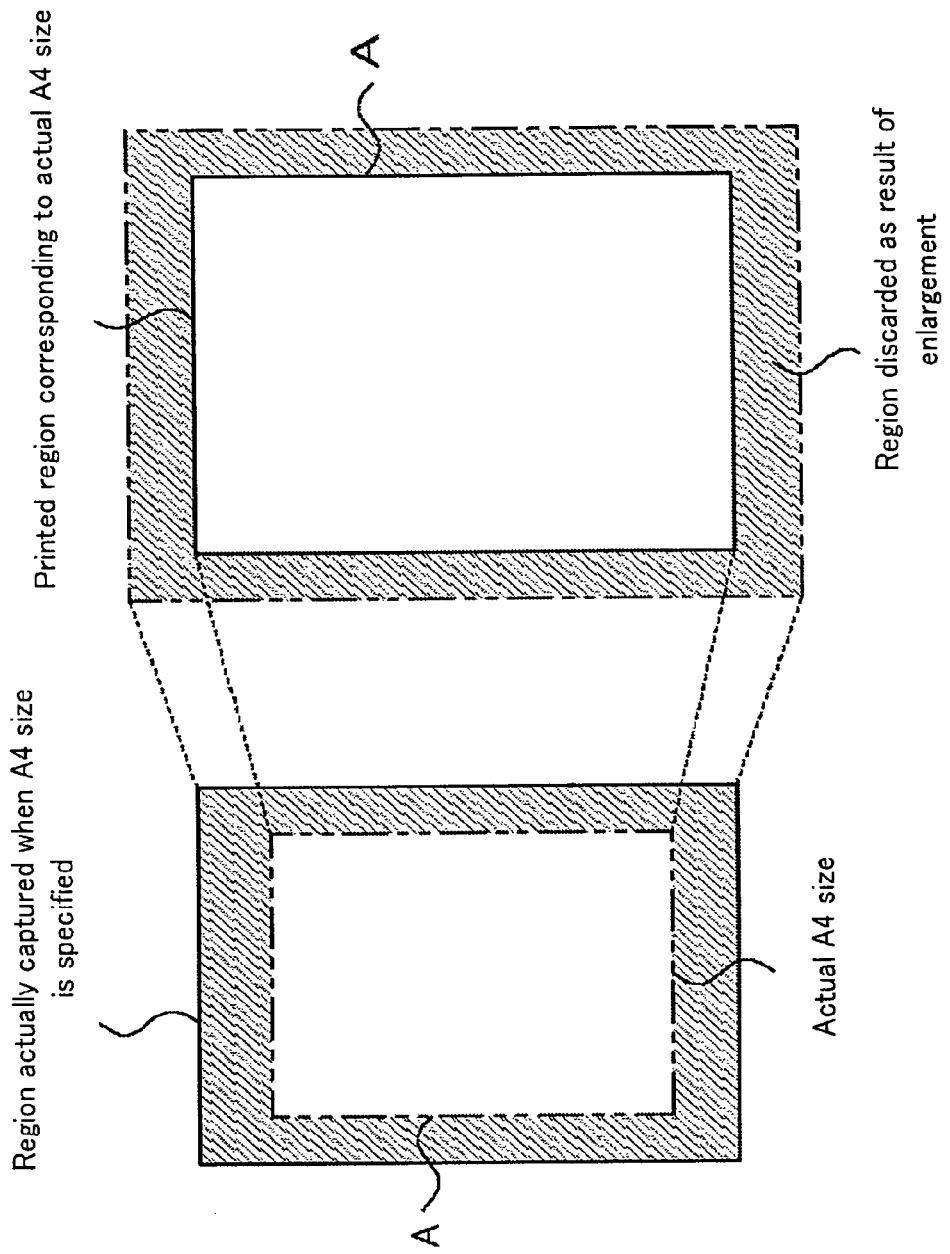
FIG. 4 is a drawing for explaining adjustment of print magnification associated with the first embodiment.
Figure 22:
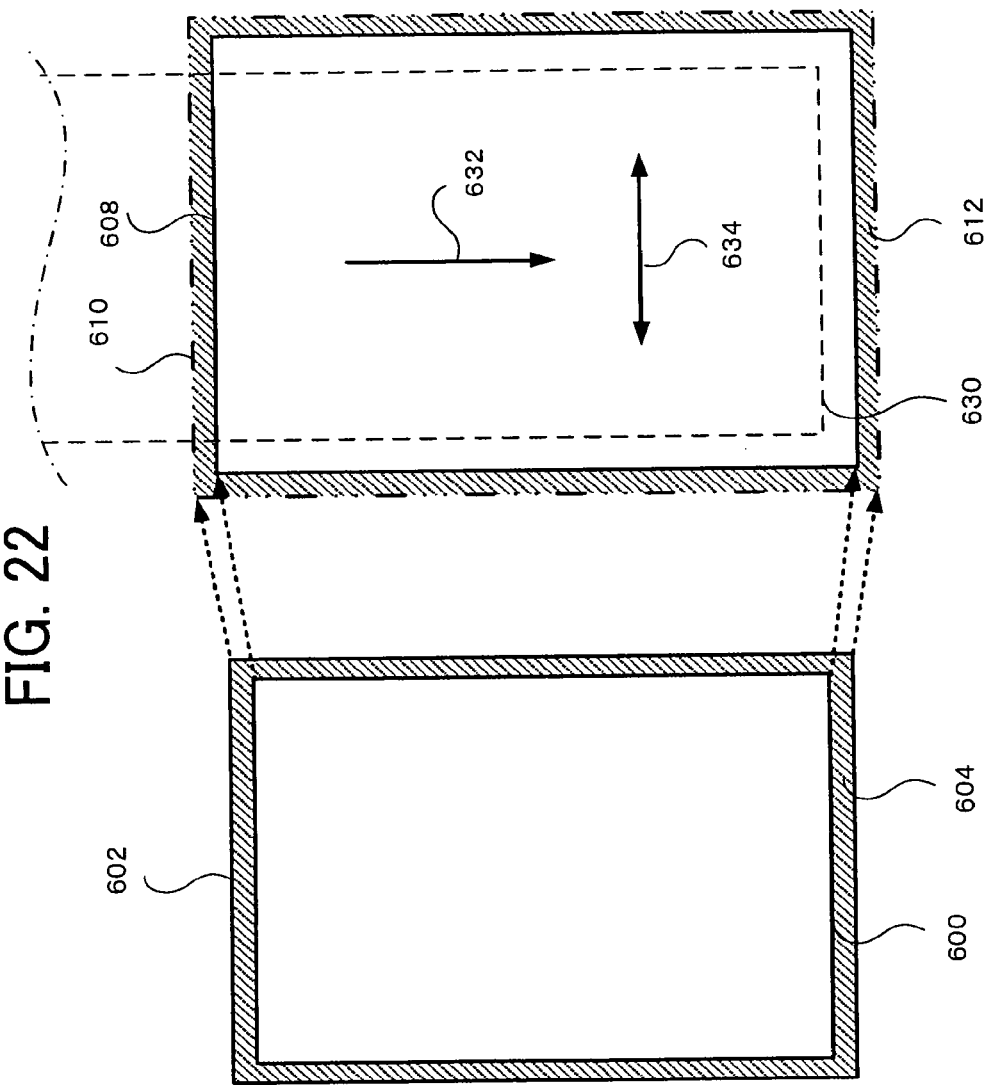
FIG. 22 is a drawing for explaining adjustment of print magnification in the context of two-sided borderless copying.

In more specific terms, as an example of the former, where—as shown in FIG. 4—an original 600 is captured at hybrid printer 1 with A4 size being specified as original size, scan region 602 might be established such that scan region 602 matches the A4-size original 600 or such that scan region 602 is slightly larger than original 600 and encompasses original 600, and this scan region 602 might be scanned. In such case, the outside edge portion 604 (the region indicated by cross-hatching) extending beyond original 600 within scan region 602 would be a superfluous region which is not supposed to appear in the print results. In the event that it is specified that four-sided borderless printing is to be carried out on A4-size printing paper, hybrid printer 1 causes scan image data (image data corresponding to scan region 602) to be enlarged in correspondence to the print magnification as indicated by the arrows drawn with dashed lines. The print magnification at this time is adjusted so as to cause the size (here, the horizontal and vertical dimensions) of original image 608 within enlarged scan image 610 to correspond to the size (A4) of printing paper 606; i.e., so as to cause enlarged original image 608 to be slightly larger than printing paper 606 in the horizontal and vertical directions and so as to encompass printing paper 606. Hybrid printer 1 discards the portion (the region indicated by cross-hatching) outside original image 608 within enlarged scan image 610, and uses data corresponding to original image 608 to carry out printing. This being the case, superfluous region 604 within the aforementioned scan region 602 is not printed and it is possible to obtain print results capable of satisfying users when four-sided borderless printing is carried out. Furthermore, as shown in FIG. 22, in the event that it is specified that two-sided borderless printing is to be carried out at continuous printing paper 630 such as roll paper which is long in vertical direction (typically the paper feed direction) 632, the aforementioned print magnification is adjusted so as to cause the size (here, the dimension in horizontal direction 634) of original image 608 within enlarged scan image 610 to correspond to the size (here, the dimension in horizontal direction 634) of printing paper 630; i.e., so as to cause enlarged original image 608 to be slightly larger than printing paper 630 in horizontal direction 634 and so as to encompass the region corresponding to printing paper 630 in horizontal direction 634. Note that because this print magnification is applied not only to the horizontal dimension of scan image 608 but is likewise applied to the vertical dimension thereof (i.e., the ratio between the horizontal and vertical dimensions of scan image 608 is preserved during magnification), scan image 608 is also enlarged in the vertical direction. As shown in FIG. 22, in the event that the bottom edge of printing paper 620 (the lead edge in the paper feed direction) is to be cut, positioning of enlarged original image 608 relative to printing paper 620 during printing processing is carried out such that enlarged original image 608 extends slightly beyond the bottom edge of printing paper 620 so as to achieve printing that is borderless at three sides—the left, right, and bottom—of printing paper 620.

Figure 5:
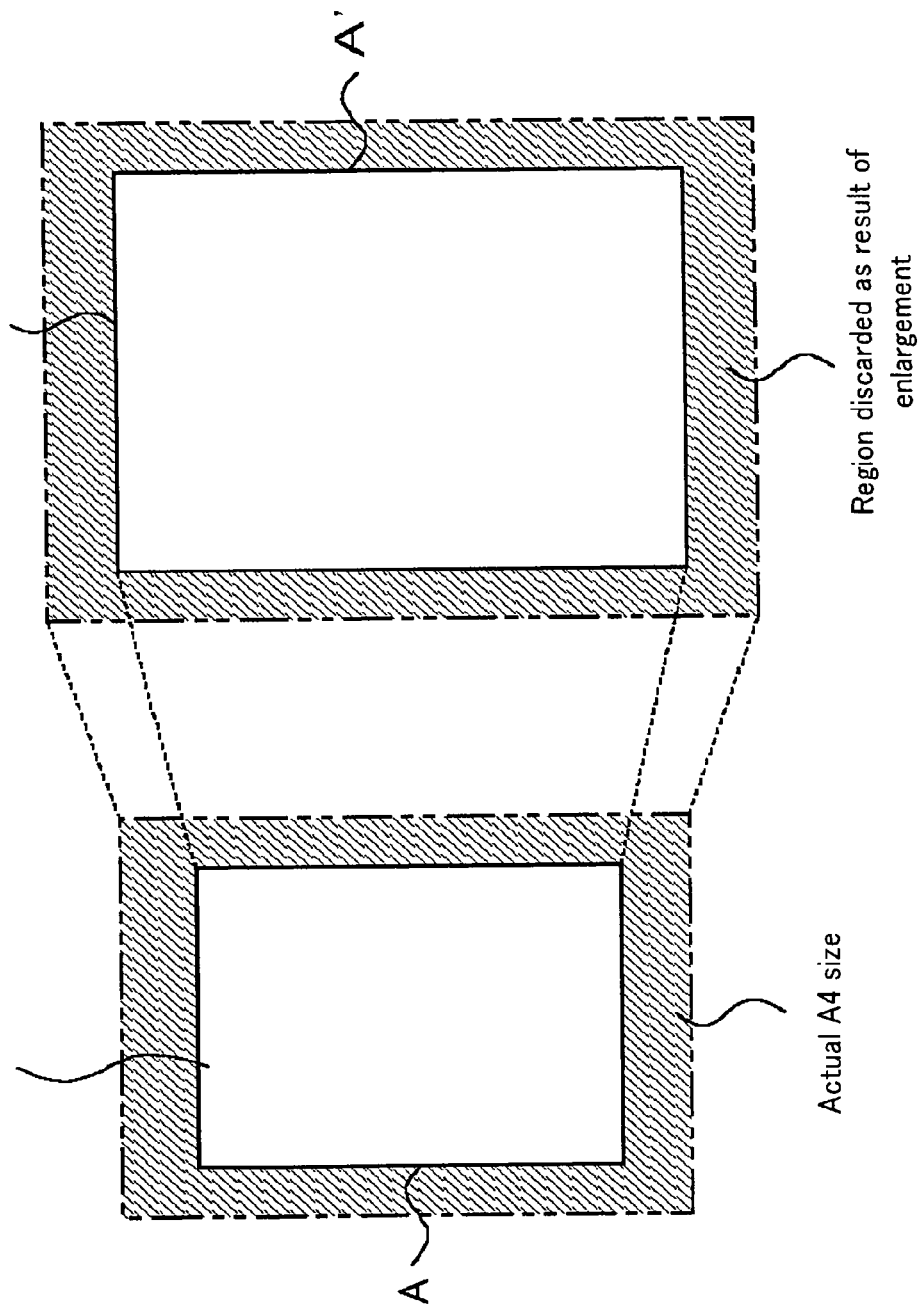
FIG. 5 is a drawing for explaining adjustment of print magnification associated with the first embodiment.
Figure 23:
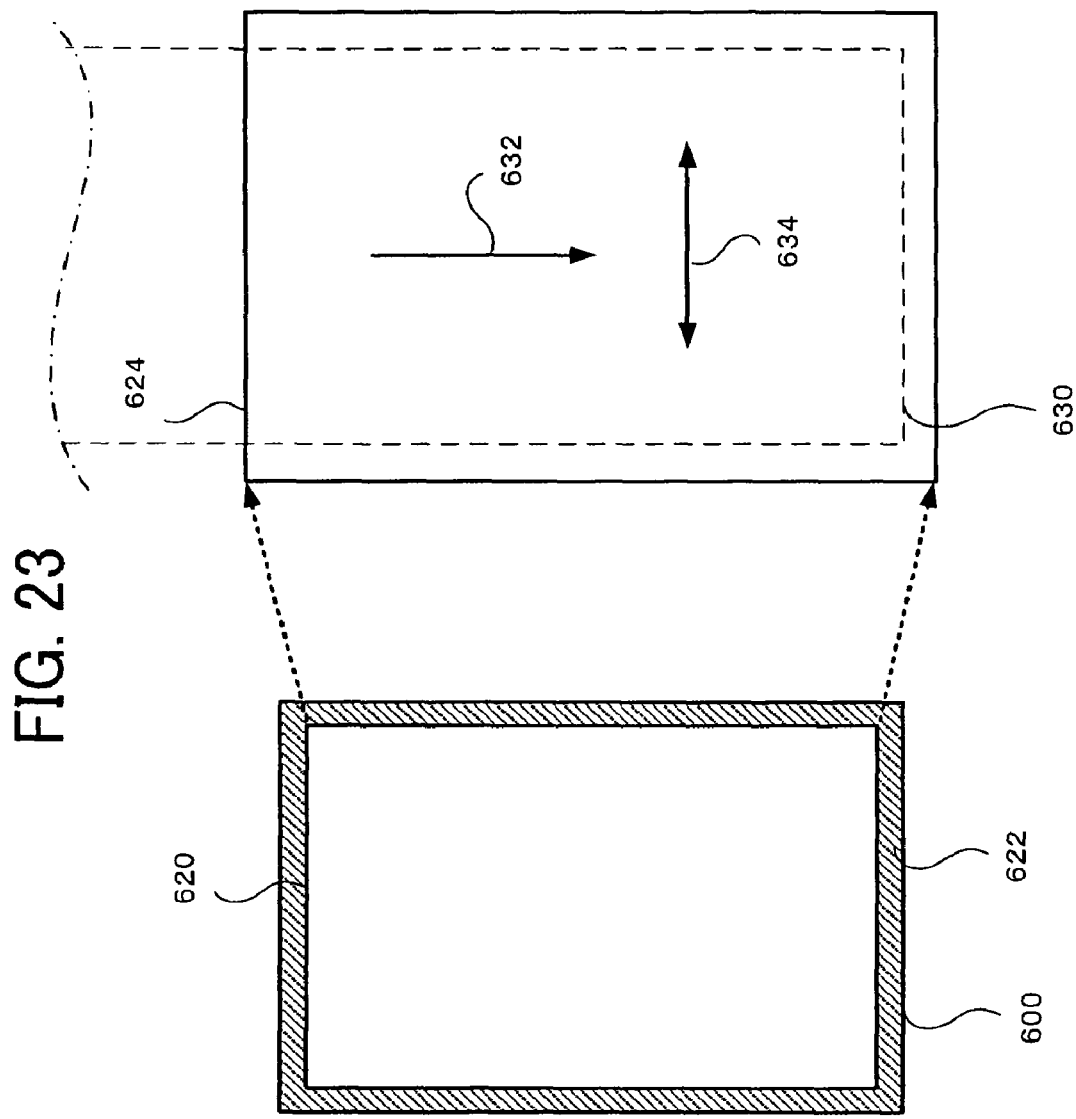
FIG. 23 is a drawing for explaining adjustment of print magnification in the context of two-sided borderless copying.

Furthermore, as an example of the latter, where—as shown in FIG. 5—an original 600 is captured at hybrid printer 1 with A4 size being specified as original size, scan region 620 might be established such that scan region 620 is smaller than the A4-size original 600 and is encompassed by that original 600, and this scan region 620 might be scanned. In such case, the outside edge portion 622 (the region indicated by cross-hatching) extending beyond scan region 620 within original 600 would not be scanned. In the event that it is specified that four-sided borderless printing is to be carried out on A4-size printing paper, hybrid printer 1 causes scan image data (image data corresponding to scan region 620) to be enlarged in correspondence to the print magnification as indicated by the arrows drawn with dashed lines. The print magnification at this time is adjusted so as to cause the size (here, the horizontal and vertical dimensions) of enlarged scan image 624 to correspond to the size (A4) of printing paper 606; i.e., so as to cause enlarged scan image 624 to be slightly larger than printing paper 606 in the horizontal and vertical directions and so as to encompass the region corresponding to printing paper 606. This being the case, it is possible to obtain print results capable of satisfying users when four-sided borderless printing is carried out. Furthermore, as shown in FIG. 23, in the event that it is specified that two-sided borderless printing is to be carried out at continuous printing paper 630 such as roll paper which is long in vertical direction (typically the paper feed direction) 632, the aforementioned print magnification is adjusted so as to cause the size (here, the dimension in horizontal direction 634) of enlarged scan image 624 to correspond to the size (here, the dimension in horizontal direction 634) of printing paper 630; i.e., so as to cause enlarged scan image 624 to be slightly larger than printing paper 630 in horizontal direction 634 and so as to encompass the region corresponding to printing paper 630 in horizontal direction 634. Note that because this print magnification is applied not only to the horizontal dimension of scan image 620 but is likewise applied to the vertical dimension thereof (i.e., the ratio between the horizontal and vertical dimensions of scan image 620 is preserved during magnification), scan image 620 is also enlarged in the vertical direction. As shown in FIG. 23, in the event that the bottom edge of printing paper 620 (the lead edge in the paper feed direction) is to be cut, positioning of enlarged original image 608 relative to printing paper 620 during printing processing is carried out such that enlarged original image 608 extends slightly beyond the bottom edge of printing paper 620 so as to achieve printing that is borderless at three sides—the left, right, and bottom—of printing paper 620.

At the examples shown in FIGS. 4, 5, 22, and 23, hybrid printer 1 establishes scan region 602 or 620 based on original 600 at original stage 12. In such case, prior to establishing scan region 602 or 620, it is necessary for hybrid printer 1 to identify where original 600 is on the original stage. To this end, hybrid printer 1 may employ method(s) in which original (s) 600 is/are detected, method(s) in which existence(s) of original(s) 600 is/are assumed, and method(s) in which region (s) corresponding to original(s) 600 is/are specified by user (s). In a method in which original 600 is detected, prior to establishing scan region 602 or 620, hybrid printer 1 might scan the entire original stage 12 during what is called prescanning, and original 600 might be automatically detected through processing of the image of the entire scanned original stage 12 (e.g., a region within the scanned original stage image at which brightness values are higher than a prescribed threshold might be extracted, and the extracted region might be identified as the region corresponding to original 600). In a method in which existence of original 600 is assumed, a region on the original stage preestablished in correspondence to the size of original 600 as specified by the user might be assumed to be original 600 (e.g., in the event that A4 size is specified by the user, a rectangular region which is 210 mm in a vertical direction and 297 mm in a horizontal direction from a prescribed corner (origin) of the original stage might be deemed to be original 600). In a method in which the region corresponding to original 600 is specified by the user, hybrid printer 1 might carry out prescanning and might display an image of the scanned original stage so as to permit the user to select an arbitrary region within the displayed original stage image, and the region selected by the user might be assumed to be original 600.

Figure 24:
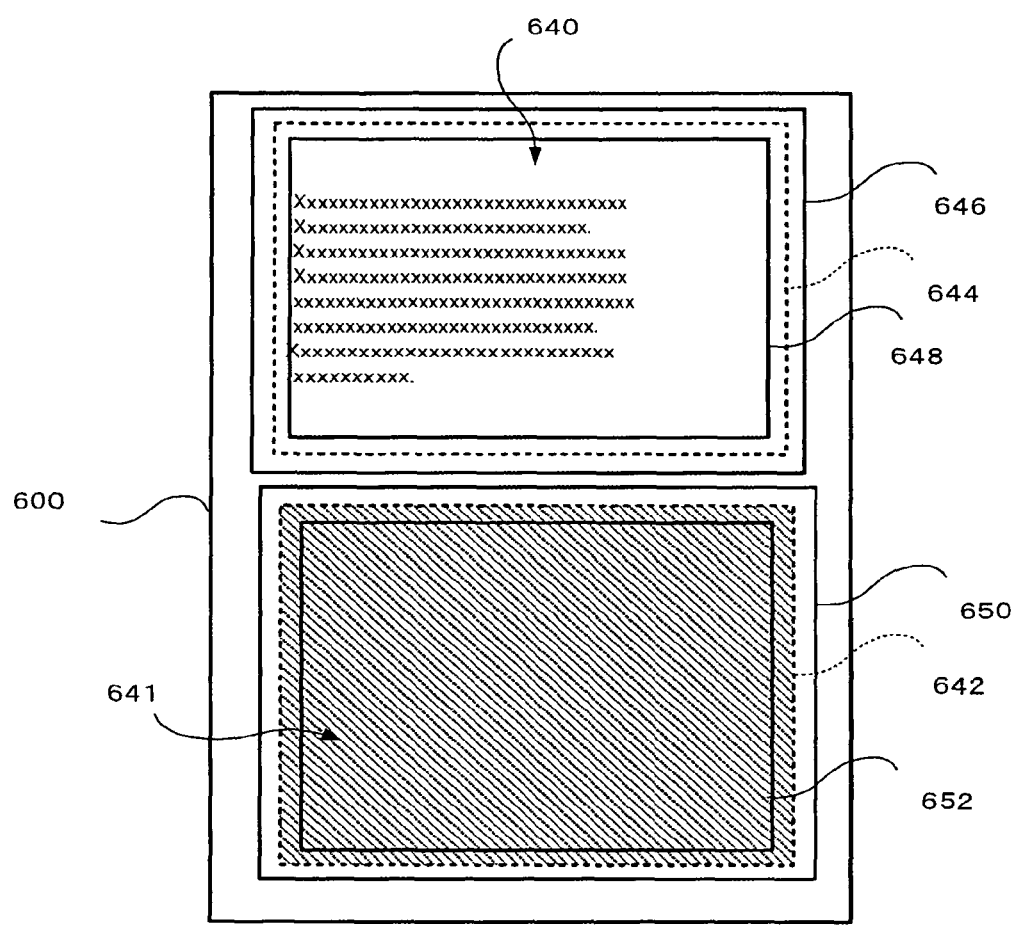
FIG. 24 is a drawing for explaining establishment of a scan region based on a region subject to printing within an original.

As described above, at the examples shown in FIGS. 4, 5, 22, and 23, hybrid printer 1 establishes scan region 602 or 620 based on original 600 at original stage 12. However, in a variation thereof, hybrid printer 1 might establish scan region(s) based not on original(s) 600 itself or themselves, but based on region(s) which is/are subset(s) of original(s) 600; particularly region(s) at which specific copy subject(s) is/are discernible (e.g., specific character(s), character string(s), photograph(s), picture(s), graphic(s), any combination hereof, etc.). FIG. 24 shows such an example. As shown in FIG. 24, character string 640 and/or photograph (or picture) 642 might, for example, be discernible within original 600. Taking, for example, the case where the copy subject is only character string 640 within original 600, hybrid printer 1 might establish scan region 646 and/or 648 based on region 644 corresponding to character string 640 within original 600. Here, scan region 646 would be established so as to match or be slightly larger than region 644 corresponding to character string 640. On the other hand, scan region 648 would be established so as to be slightly smaller than region 644 corresponding to character string 640. Or taking as another example the case where the copy subject is only photograph 642 within original 600, hybrid printer 1 might establish scan region 650 and/or 652 based on photograph 642 within original 600. Here, scan region 650 would be established so as to match or be slightly larger than photograph 642. On the other hand, scan region 652 would be established so as to be slightly smaller than photograph 642. Beyond the foregoing, no special description will be made in the present specification with respect to operation and function of hybrid printer 1 in the context of establishment of scan region(s) based on region(s) corresponding to copy subject(s) within original(s) such as has been mentioned. That is, description is hereinafter focused on operation and function of hybrid printer 1 in the context of establishment of scan region(s) based on region(s) corresponding to original(s) on original stage(s). However, in the description of the operation and function of hybrid printer 1 which follows and in the foregoing description made with reference to FIGS. 4, 5, 22, and 23, by reading "copy subject(s) within original(s)" where the term "original" or "original(s)" appears therein, the description may be understood to also apply to establishment of scan region(s) based on region(s) corresponding to copy subject(s) within original(s). Accordingly, from the description contained in the present specification, one skilled in the art will readily understand operation and function of hybrid printer 1 in the context of establishment of scan region(s) for region(s) corresponding to specific copy subject(s) within original(s) as similar to that occurring in the context of establishment of scan region(s) based on region(s) corresponding to original(s).

Figure 6:
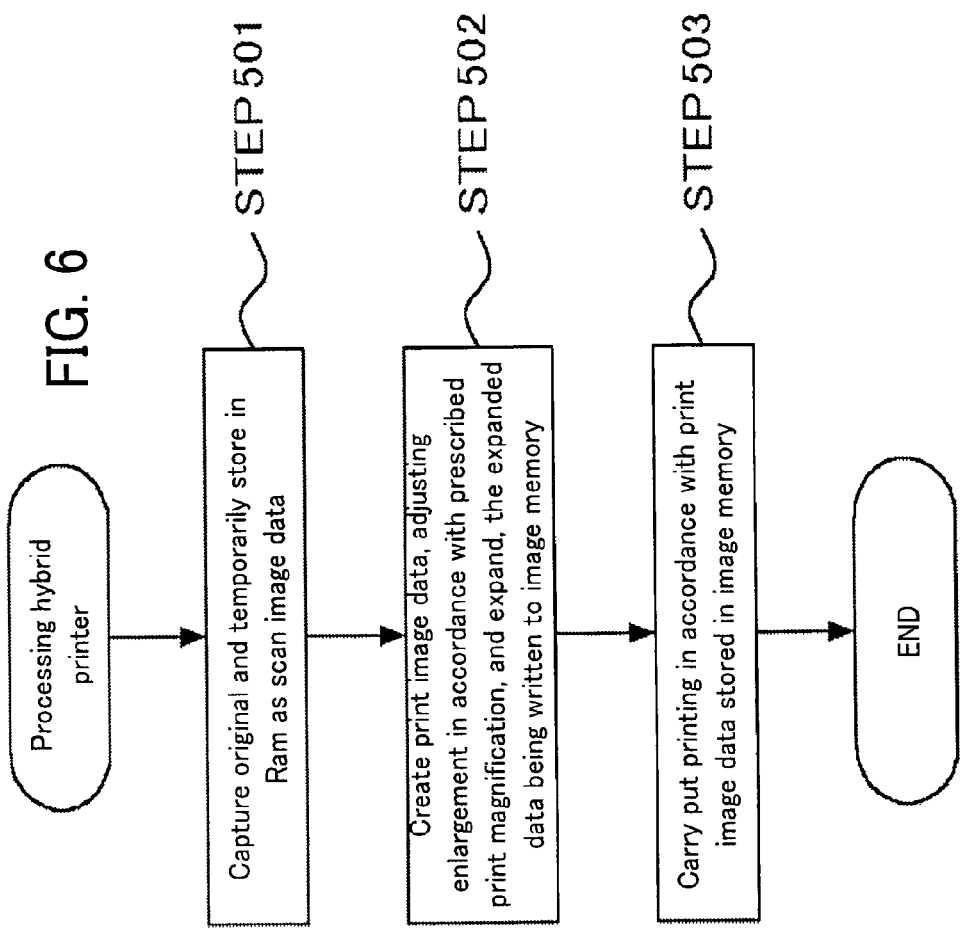
FIG. 6 is a flowchart for explaining operation of a hybrid printer associated with the first embodiment.

FIG. 6 is a flowchart for explaining operation of hybrid printer 1 associated with the present embodiment. At same FIG., the series of processing steps occurring following capture of original(s) in the form of image(s) by means of scanner functionality up to the point in time when printing thereof is carried out by means of printing functionality is shown in a single flowchart.

To wit, when a user places an original on original stage 12, closes cover 13, and operates user interface 11 so as to give image scan instruction(s) and/or printing instruction(s), hybrid printer 1, under the control of scanner circuitry 209, controls the scanner mechanism and carries out operations for scanning of the original, the scanned image being temporarily stored at RAM 23 in the form of scan image data (step 501). Following completion of scanning by the scanner mechanism, hybrid printer 1 converts the scan image data into print image data which is expanded, the expanded data being written to image memory 26. At this time, hybrid printer 1 carries out conversion into image data consistent with a print magnification (e.g., 105%) which has been previously set so as to cause the print image to be enlarged relative to the initial image (original image) (step 502). Moreover, following conclusion of conversion into image data, hybrid printer 1 supplies the image data which has been stored in image memory 26 to print engine 28, and carries out printing on printing paper (step 503). Note also that supply of print image data to print engine 28 may be initiated at the stage where print image data of a prescribed width of band(s) have been stored at image memory 26.

As described above, in accordance with the present embodiment, because print image data is created based on captured scan image data with print magnification being adjusted in such manner as to cause printed image(s) to be enlarged relative to original image(s) by amount(s) such as would not appear visually strange to user(s) and printing is carried out in accordance with such created print image data, even where scan region(s) during capture of image(s) contain superfluous region(s) and/or contain margin-like region(s) in the event that it is not possible to capture the entire original, such superfluous region(s) and/or margin-like region(s) will not appear in print results and it is possible to obtain results capable of satisfying users when four-sided borderless printing is carried out. In particular, the present embodiment makes it possible to address user demand with respect to ability to achieve satisfactory four-sided borderless printing while keeping product cost to a minimum and without the need to improve the mechanical precision of the scanner mechanism and/or the print mechanism.

Next, a second embodiment of a hybrid printer in accordance with the present invention will be described.

Such a hybrid printer might, for example, have a constitution such as is shown in FIGS. 1 and 2, and might, moreover, be provided not only with hybrid printer functionality but also with functionality permitting it to also serve as standalone image scanner and functionality permitting it to also serve as standalone inkjet printer. Such a hybrid printer might have user-selectable scanner mode(s), printer mode(s), and hybrid printer mode(s), such modes being capable of being entered in alternative fashion in response to user request; i.e., such hybrid printer might be capable of being used in multimode fashion (such a hybrid printer will hereinafter be referred to as a "multimode hybrid printer").

In the event that scanner mode has been specified, the multimode hybrid printer might carry out processing whereby image(s) of original(s) placed at prescribed location(s) on original stage(s) is/are optically scanned, scan image data is created, and such scan image data is sent to personal computer(s) and/or other such host apparatus(es), not shown. In the event that printer mode has been specified, the multimode hybrid printer might carry out processing whereby print image data is received from host apparatus(es), not shown, and image(s) represented by such print image data is/are printed on user-specified printing paper. In the event that hybrid printer mode has been specified, the multimode hybrid printer might carry out processing whereby print image data is created based on scan image data created as a result of scanning of original(s) placed on original stage(s), and print image(s) represented by such print image data is/are printed on user-specified printing paper.

Provided at control panel(s), not shown, provided at the multimode hybrid printer there are a plurality of buttons for entering desired setting(s) at and/or giving desired command (s) to the multimode hybrid printer, and display screen(s) at which current mode setting(s) of the multimode hybrid printer, status(es) of the multimode hybrid printer, and/or the like may be displayed. User(s) can use such control panel(s) to switch among scanner mode(s), printer mode(s), and hybrid printer mode(s). Furthermore, within hybrid printer mode, user(s) can use such control panel(s) to selectively specify NORMAL COPY MODE(S), COMPLETELY BORDERLESS COPY MODE(S), and/or QUASI-BORDERLESS COPY MODE(S), described below, and/or to enter settings with respect to number (sets) of copies.

Below, referring to FIG. 7 and following FIGS., a multimode hybrid printer operating in NORMAL COPY MODE (S), COMPLETELY BORDERLESS COPY MODE(S), and/or QUASI-BORDERLESS COPY MODE(S) will be described in detail.

Figure 7:
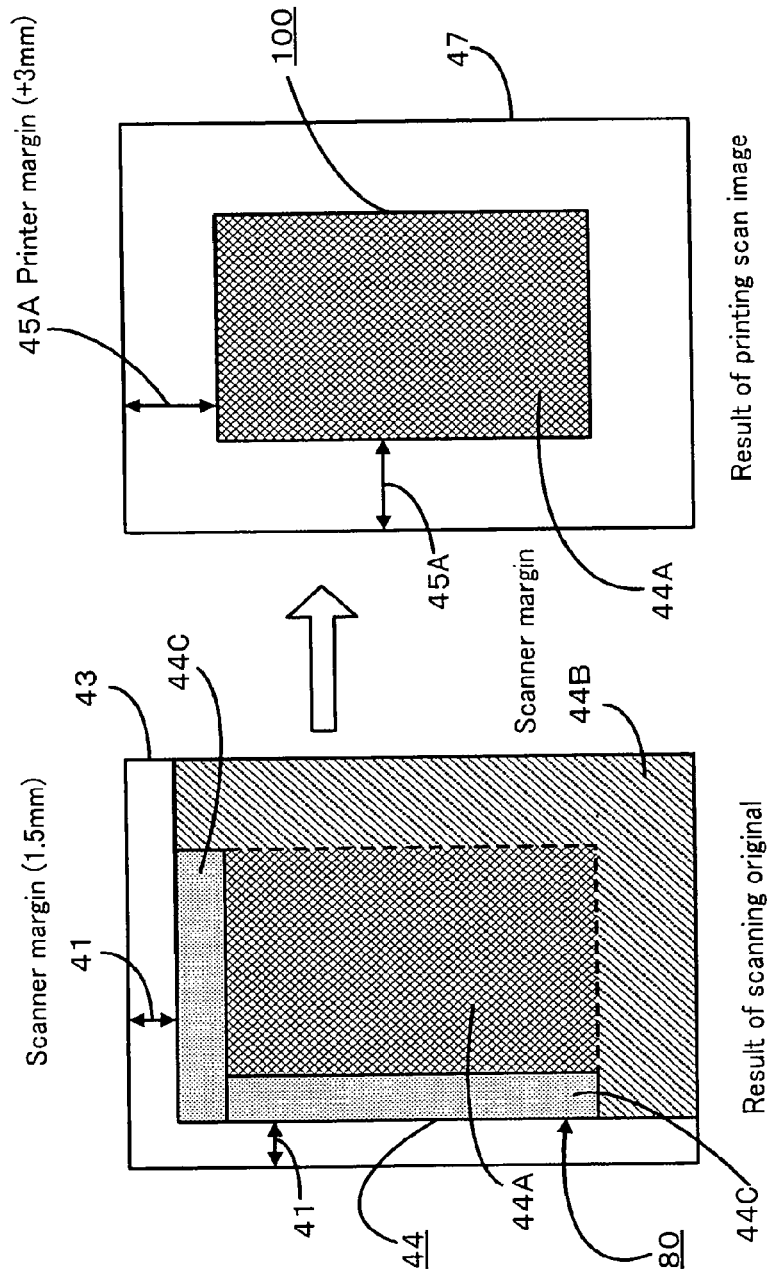
FIG. 7 is a drawing showing copying as might occur when carrying out operations in accordance with a NORMAL COPY MODE at a hybrid printer associated with a second embodiment of the present invention.

FIG. 7 is a drawing showing results of copying as might occur when in NORMAL COPY MODE. Note that, in order to simplify the description which follows, as shown in this drawing the size of original 43 and the size of printing paper 47 are assumed to be identical, and copy magnification is assumed to be "unity magnification" (and the same is also assumed to be true with respect to FIGS. 8 through 11, below).

NORMAL COPY MODE is a mode for causing the image of original 43 to be copied with margin-like space(s). Notwithstanding that other mode(s) calling for the image of original 43 to be copied without border(s) (i.e., COMPLETELY BORDERLESS COPY MODE and/or QUASI-BORDERLESS COPY MODE) may have been set, NORMAL COPY MODE is the mode that will automatically be entered in the event that the size of printing paper 47 is not among the aforementioned specific size(s) accommodating borderless printing.

In NORMAL COPY MODE, normal-copy printer margin (s) 45A (e.g., +3 mm) is/are set such as is/are sufficient to definitively prevent ink from being jetted beyond the edges of printing paper 47 due to variation in print start location (or, stated from a different perspective, such as is/are sufficient to definitively cause formation of margin-like spaces at the top, bottom, left, and right edges of printing paper 47 despite variation in print start location).

Furthermore, in NORMAL COPY MODE, scanner margin (s) 41 is/are set such as will permit the image of original 43 to be definitively scanned despite variation in original scan start location. Scanner margin(s) 41 is/are ordinarily set to value(s) (e.g., 1.5 mm) which is/are smaller than normal-copy printer margin(s) 45A (similar value(s) also being set for same in the other modes COMPLETELY BORDERLESS COPY MODE and QUASI-BORDERLESS COPY MODE). The reason for this is that it is possible to achieve a mechanical precision with image scanner 23 that is higher than that of printer 24, as a result of which it is possible to achieve a variation in original scan start location that is smaller than the variation in print start location.

Copying might take place as follows when in NORMAL COPY MODE.

To wit, at original 43 which has been placed on an original stage, an image scanner might scan the locus (i.e., scan region) 44 to the interior of previously set scanner margin 41. As a result, scanner circuitry creates scan image data representing scan image 80 present within scan region 44.

Processor(s) within the multimode hybrid printer correct the size of scan image 80 represented by scan image data, transforming it into a size such as will fit inside region (print region) 100 on printing paper 47 which is stepped inward from the edge(s) of printing paper 47 by the amount of normal-copy printer margin 45A, creating print image data representing scan image 44A which has been corrected in size, and cause scan image 44A to be printed on printing paper 47 based on that print image data.

More specifically, based on normal-copy printer margin 45A, processor(s) within the multimode hybrid printer crop portion(s) 44B, identical in width to normal-copy printer margin 45A, from portion(s) containing the right edge and bottom edge of scan image 80. Moreover, from portion(s) containing the top edge and left edge of the rectangular region which remains after cropping, processor(s) crop portion(s) 44C containing the margin(s) remaining after scanner margin 41 is subtracted from normal-copy printer margin 45A (portion(s) 44C may, instead of being portion(s) containing the top edge and left edge, be portion(s) containing the bottom edge and right edge). In addition, processor(s) control engine controller(s) such that printing is carried out on paper 47 so as to cause the portion 44A to be printed which remains after the aforementioned portion(s) 44B and portion(s) 44C have been cropped from scan image 80 (i.e., the scan image after correction in size) to be positioned in the center of printing paper 47 (i.e., so as to cause the center of the portion 44A to be printed to coincide with the center of printing paper 47). As a result, margin-like spaces equal to normal-copy printer margin 45A are formed in the vicinities of the top, bottom, left, and right edges of printing paper 47 on which the portion 44A to be printed has been printed. Note that the print start location for causing the portion 44A to be printed to be positioned in the center of paper 47 may, with the upper left corner of the portion 44A to be printed serving as reference point, have been determined in advance or may be determined based on calculation performed during printing of each page.

By means of a method such as the foregoing, it is possible to carry out copying at unity magnification with formation of margin-like spaces equal to printer margin 45A even where scanner margin 41 is smaller than printer margin 45A.

Figure 8:
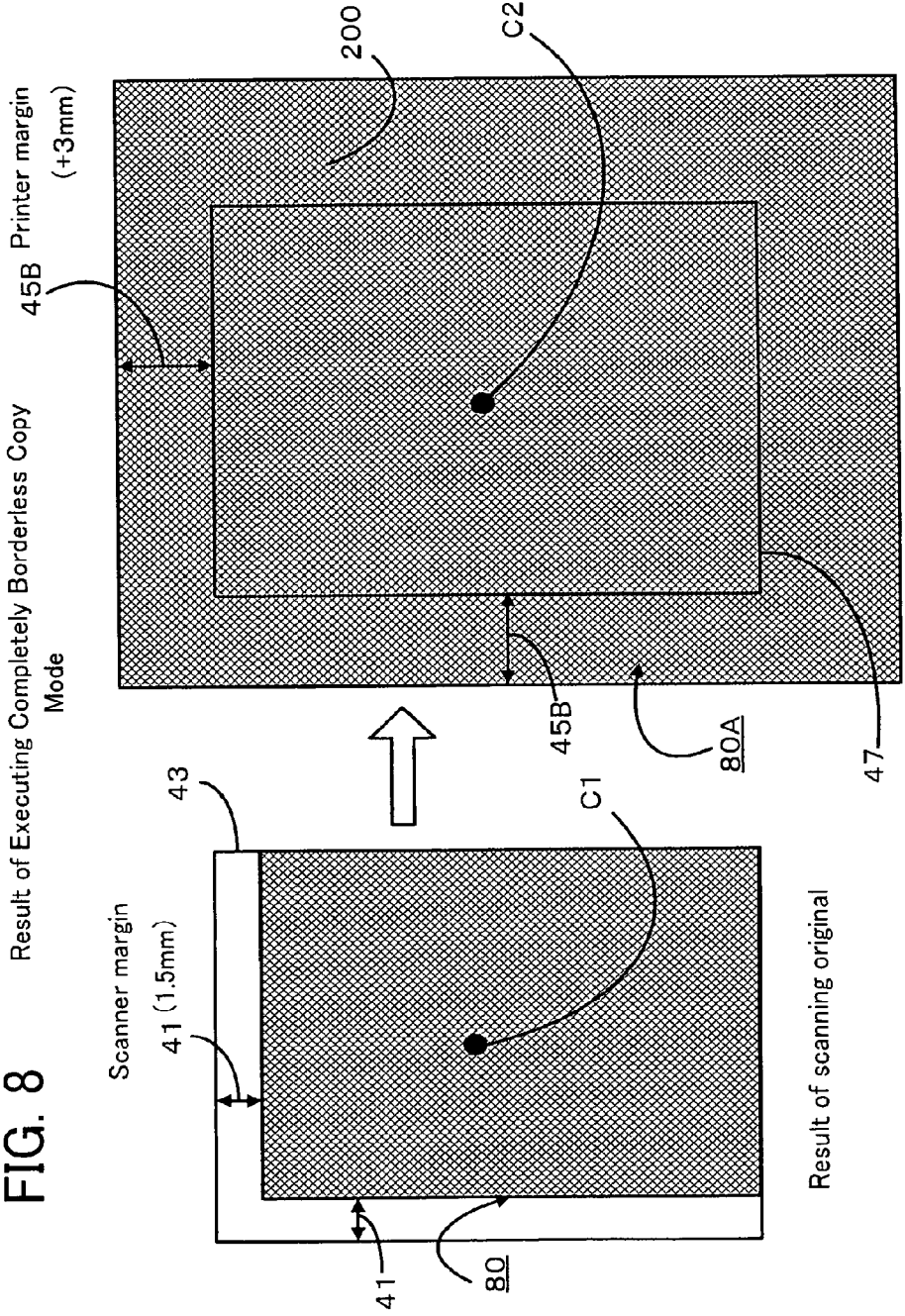
FIG. 8 is a drawing showing copying as might occur when carrying out operations in accordance with a COMPLETELY BORDERLESS COPY MODE at a hybrid printer associated with the second embodiment.

FIG. 8 is a drawing showing results of copying as might occur when in COMPLETELY BORDERLESS COPY MODE.

COMPLETELY BORDERLESS COPY MODE is a mode for causing the image of original 43 to be copied completely without formation of margin-like space(s) (execution of this mode may not be possible unless, for example, the size of printing paper 47 is among the aforementioned specific size (s) accommodating borderless printing).

In COMPLETELY BORDERLESS COPY MODE, scan image 80 is printed on printing paper 47 such that it is enlarged so as to be a size which is larger than the size of printing paper 47. As scan image size(s) which will definitively ensure successful borderless printing, considering the variation in print start location attributable to the mechanical precision of the print mechanism of the multimode hybrid printer, where, for example, the scan image is disposed in the center of paper 47, size(s) might be employed such as is/are sufficient to cause such image to extend at least approximately 3 mm beyond the top, bottom, left, and right edges of the printing paper. Considering the width(s) of such overextending portion(s) 200 to be "printer margin(s)" under a broad definition of that term, completely-borderless-copy printer margin 45B is set in advance and copying is carried out based on this printer margin 45B when in COMPLETELY BORDERLESS COPY MODE. Completely-borderless-copy printer margin 45B, which is such as to cause the size of the printed image to be a size definitively extending beyond the edges of paper 47 and which is thus set with the intention of causing printing to be carried out such that margin-like space(s) are definitively not formed, is in a symmetric relationship with normal-copy printer margin 45A, which is such as to cause the entire printed image to definitively fit within the confines of paper 47 and which is thus set with the intention of preventing jetting of ink beyond the edges of paper 47 and soiling of platen 111. In the present embodiment, therefore, the size of normal-copy printer margin 45A will be represented by a positive value, and completely-borderless-copy printer margin 45B will be represented by a negative value (e.g., −3 mm).

Now, copying might take place as follows when in COMPLETELY BORDERLESS COPY MODE.

To wit, scanner circuitry acquires scan image 80 by scanning an image of the region (i.e., scan region) on original 43 which is stepped inward from the edge(s) of original 43 by the amount of previously set scanner margin 41.

Processor(s) within the multimode hybrid printer enlarge acquired scan image 80, creating image 80A, consistent with printer margin 45B. Note, however, that the magnification by which image 80A is enlarged at this time is definitively less than would be the case were conventional borderless-printing printer technology to be applied without modification to a conventional hybrid printer. The reason for this is that, in the present embodiment, scanner margin 41 is not set so as to be equal in size to the large printer margin 45A employed for normal copying but is set to a small size consistent with the high mechanical precision of the scanner mechanism. As a result, copying can be carried out at magnification(s) close to unity magnification even when borderless copying is being carried out.

Now, having enlarged scan image 80 and transformed it into image (hereinafter "enlarged scan image") 80A, processor(s) control engine controller(s) so as to cause enlarged scan image 80A to be printed on paper 47 such that center C1 of original 43 at enlarged scan image 80A coincides with center C2 of printing paper 47 representing copy results. As a result, an image of the scan region of original 43 is copied in borderless fashion at the center of printing paper 47 (but note that since scan image 80 is enlarged so as to be larger than the size of printing paper 47, this does not mean that the entire expanse of scan image 80 will fall on paper 47). Note that the print start location for carrying out such copying may have been determined in advance or may be determined based on calculation performed during printing of each page.

Figure 9:
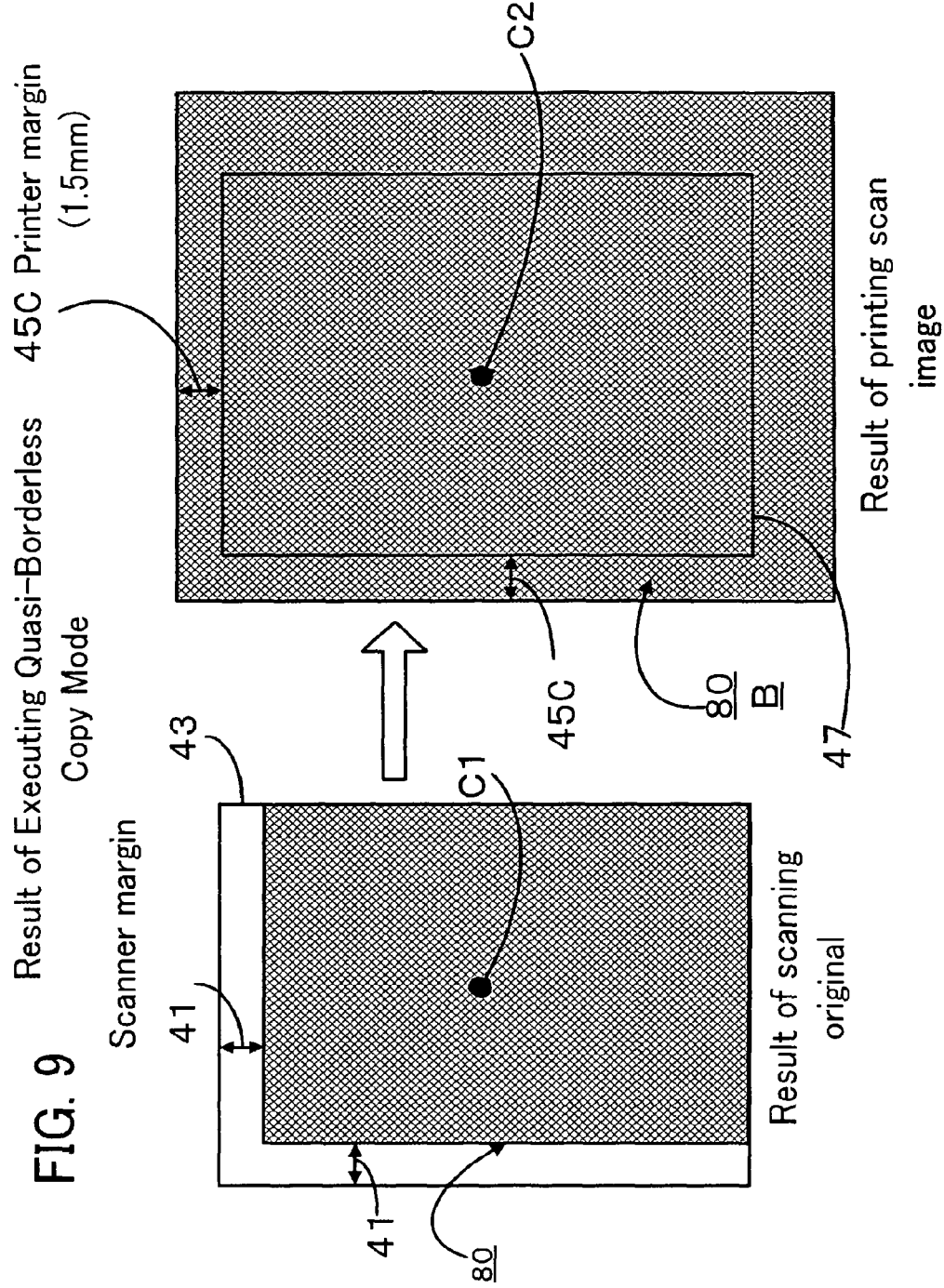
FIG. 9 is a drawing showing copying as might occur when carrying out operations in accordance with a QUASI-BORDERLESS COPY MODE at a hybrid printer associated with the second embodiment.

FIG. 9 is a drawing showing results of copying as might occur when in QUASI-BORDERLESS COPY MODE.

QUASI-BORDERLESS COPY MODE is a mode for obtaining a borderless image of an original but at magnification(s) closer to desired copy magnification(s) (e.g., unity magnification) than would be the case with COMPLETELY BORDERLESS COPY MODE.

In QUASI-BORDERLESS COPY MODE, the printer margin(s) (hereinafter "quasi-borderless-copy printer margin(s)") 45C which is/are set is/are of size(s) (e.g., −1.5 mm) smaller than normal-copy printer margin(s) 45A (e.g., +3 mm) but larger than completely-borderless-copy printer margin(s) 45B (e.g., −3 mm). This being the case, in QUASI-BORDERLESS COPY MODE, enlarged scan image 80B is, when printed, larger than a size such as will fit inside the region on printing paper 47 which is stepped inward from the edge(s) of printing paper 47 by the amount of normal-copy printer margin 45A, but smaller than the size of scanned image 80A as printed when in COMPLETELY BORDERLESS COPY MODE. As a result, when copying is carried out in QUASI-BORDERLESS COPY MODE, it will be the case either that absolutely no margin-like space is formed or, if margin-like space(s) is/are formed, that margin-like space(s) narrower in width than would be the case with NORMAL COPY MODE is/are formed at least one edge of printing paper 47. Because copying may be carried out completely without formation of margin-like space(s), it will not be possible to execute QUASI-BORDERLESS COPY MODE unless the size of printing paper 47 is among the aforementioned specific size(s) accommodating borderless printing, just as was the case with COMPLETELY BORDERLESS COPY MODE.

Copying may be carried out in QUASI-BORDERLESS COPY MODE in the same fashion as in COMPLETELY BORDERLESS COPY MODE.

To wit, scanner circuitry acquires scan image 80 by scanning an image of the region on original 43 which is stepped inward from the edge(s) of original 43 by the amount of previously set scanner margin 41.

Processor(s) within the multimode hybrid printer enlarge acquired scan image 80 and create image (hereinafter "enlarged scan image") 80B consistent with printer margin 45C. The magnification of enlarged scan image 80B at this time is less than would be the case with COMPLETELY BORDERLESS COPY MODE, as was stated above. As a result, in the event that borderless printing is successful, the image produced as a result of copying will be an image which is closer to the desired magnification(s) (e.g., unity magnification) than would be the case for a borderless image produced in COMPLETELY BORDERLESS COPY MODE.

Now, having created enlarged scan image 80B, processor(s) control engine controller(s) so as to cause enlarged scan image 80B to be printed on paper 47 such that center C1 of original 43 at enlarged scan image 80B coincides with center C2 of printing paper 47 representing copy results. As a result, image 80 of the scan region of original 43 can be copied in borderless fashion at the center of printing paper 47. Note that the print start location for carrying out such copying may have been determined in advance or may be determined based on calculation performed during printing of each page.

Figure 10:
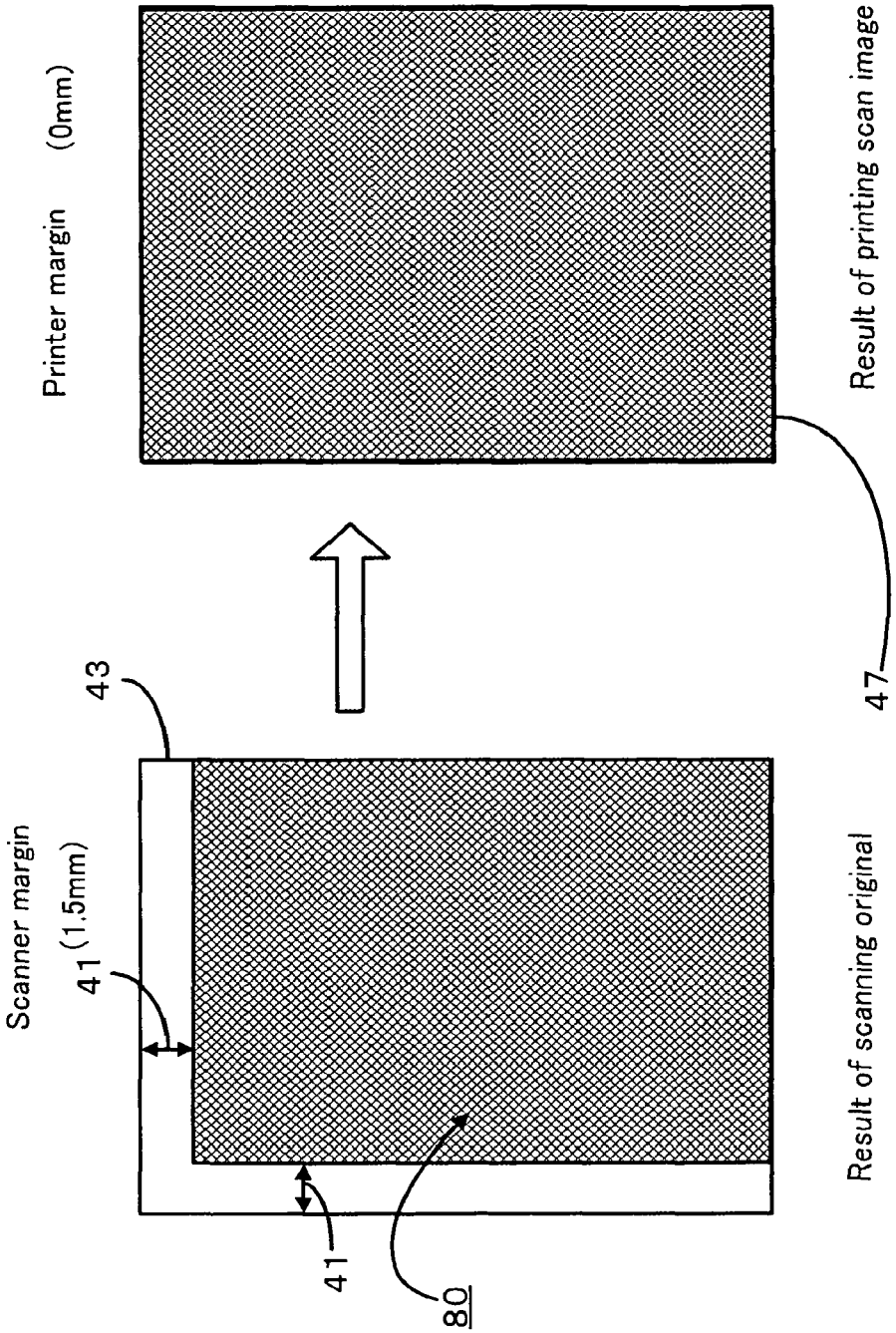
FIG. 10 is a drawing showing copying as might occur when employing the QUASI-BORDERLESS COPY MODE of FIG. 9 and when printer margin 45C is changed.
Figure 11:
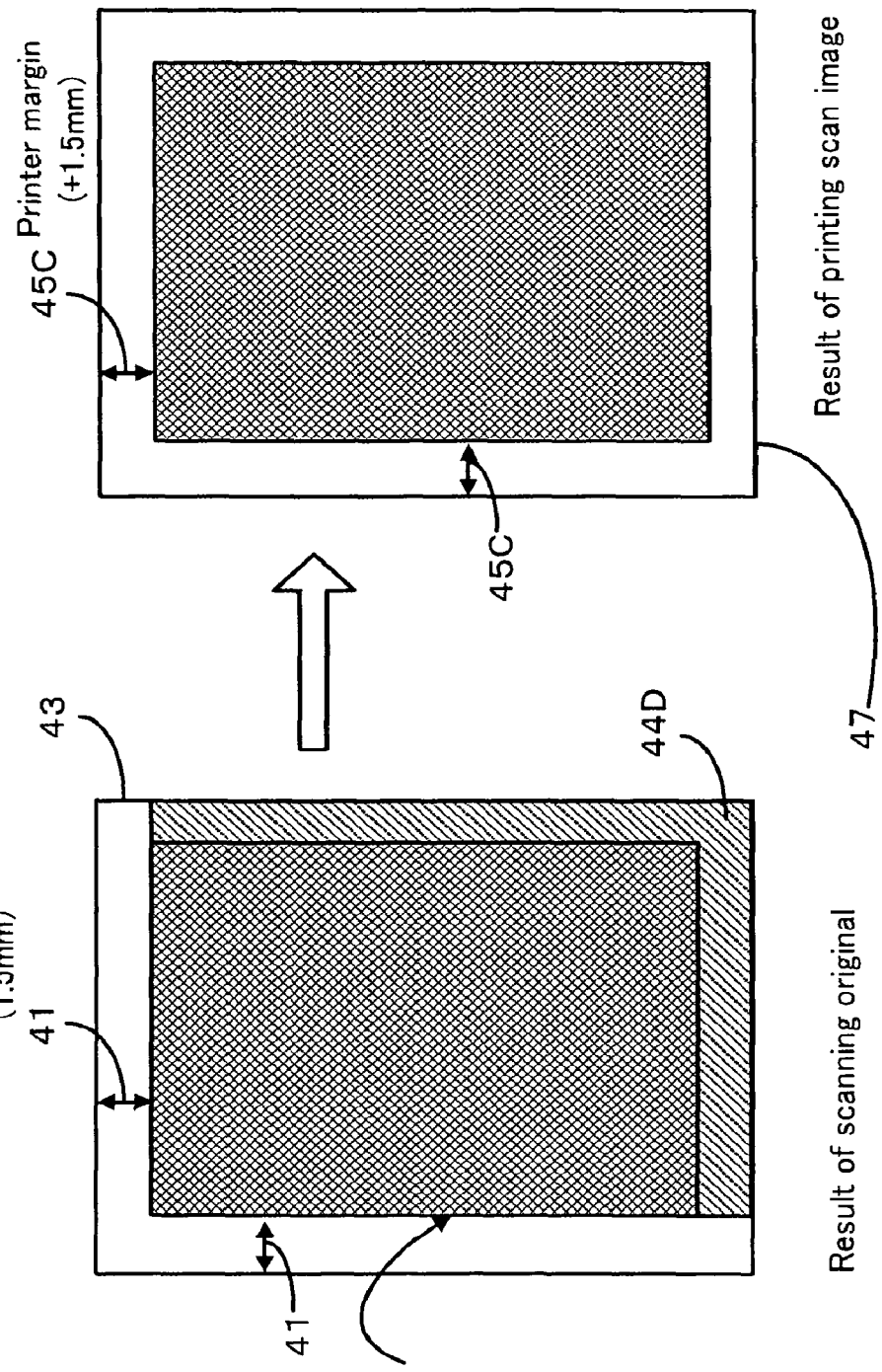
FIG. 11 is a drawing showing copying as might occur when employing the QUASI-BORDERLESS COPY MODE of FIGS. 9 and 10 and when printer margin 45C is changed.

Above, QUASI-BORDERLESS COPY MODE has been described. Note that, in this mode, printer margin(s) 45C may be any size whatsoever so long as the aforementioned condition is satisfied (i.e., printer margin(s) 45C must be within the range from normal-copy printer margin 45A to completely-borderless-copy printer margin 45B). For example, as shown in FIG. 10, employing a quasi-borderless-copy printer margin 45C of 0 mm will permit (but not definitively however) execution of completely borderless copying at copy magnification(s) closest to that or those desired by user(s) (e.g., unity magnification). Furthermore, as shown in FIG. 11, employing a quasi-borderless-copy printer margin 45C of 1.5 mm—the same as scanner margin 41—will permit execution of substantially completely borderless copying (some small margin-like space(s) being formed) but at copy magnification(s) exactly matching that or those requested by user(s) (in which case, scan image 80 may be printed without modification or may be printed after first cropping away therefrom prescribed portion(s) 44D consistent with quasi-borderless-copy-mode printer margin 45C).

Furthermore, in QUASI-BORDERLESS COPY MODE, quasi-borderless-copy printer margin 45C may be automatically adjusted within the aforementioned range in accordance with prescribed algorithm(s) (e.g., based on the state of the multimode hybrid printer). More specifically, automatic adjustment of magnification(s) of scan image 80 within a specific range (e.g., within a range from 100% to 105% where the copy magnification desired by the user is 100% (unity magnification)) might cause quasi-borderless-copy-mode printer margin 45C to be automatically adjusted within the aforementioned range. Referring to the example shown in FIG. 12, in the event that the magnification of scan image 80 is adjusted, the print start location of scan image 80A as enlarged based on adjusted magnification may itself be adjusted based on calculation and/or preprepared table(s) (table(s) recording respective print start location(s) corresponding to respective magnification(s)).

Figure 13:
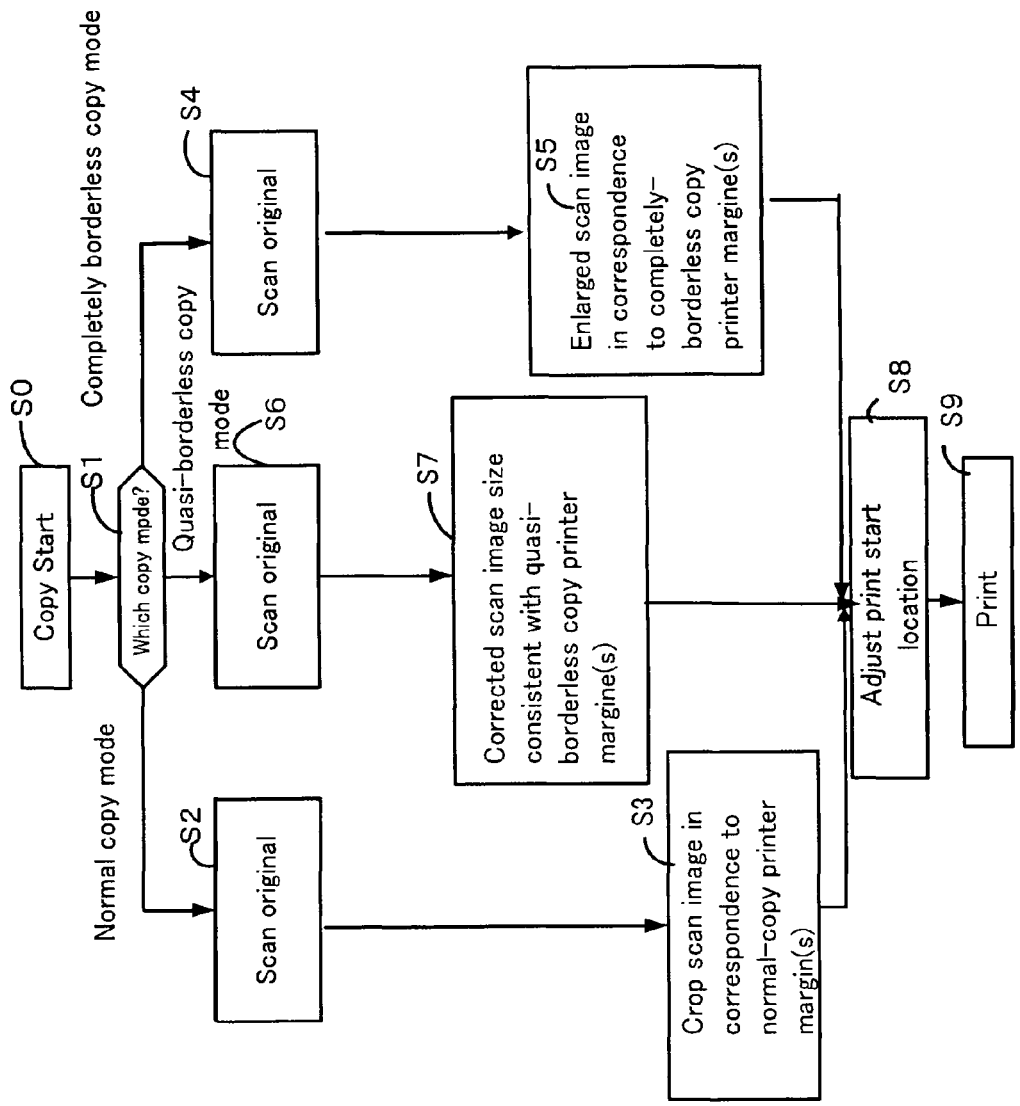
FIG. 13 is a flowchart showing flow of processing in connection with copying such as might be carried out in the context of a multimode hybrid printer.

Below, referring to FIG. 13, flow of processing in connection with copying such as might be carried out in the context of the aforementioned multimode hybrid printer is described. Note that, in the description which follows, original and printing paper sizes are for convenience of description assumed to be identical, and printing paper size(s) are assumed to be size(s) accommodating completely borderless copying. Furthermore, the copy magnification specified by the user is assumed to be unity magnification.

When a copy start button (not shown) on a control panel is pressed, the multimode hybrid printer begins copying (step S0).

At such time, in the event that the mode specified by the user is NORMAL COPY MODE (NORMAL COPY MODE at S1), flow of processing might be as follows (note that the following description is made with reference to FIG. 13).

That is, an image of the original placed on the original stage is first scanned (S2) consistent with scanner margin 41 (e.g., 1.5 mm), and scan image 80 is acquired. In addition, this scan image 80 is cropped consistent with normal-copy printer margin 45A (e.g., 3 mm), perimeter portion(s) 44B and portion(s) 44C thereof being removed therefrom in the manner as has already been described (S3). Print start location(s) of portion(s) 44A which remain after cropping is/are adjusted based on calculation and/or preprepared table(s) as described above (S8), and portion(s) 44A is/are thereafter printed at the approximate center of printing paper 47 (S9).

Figure 12:
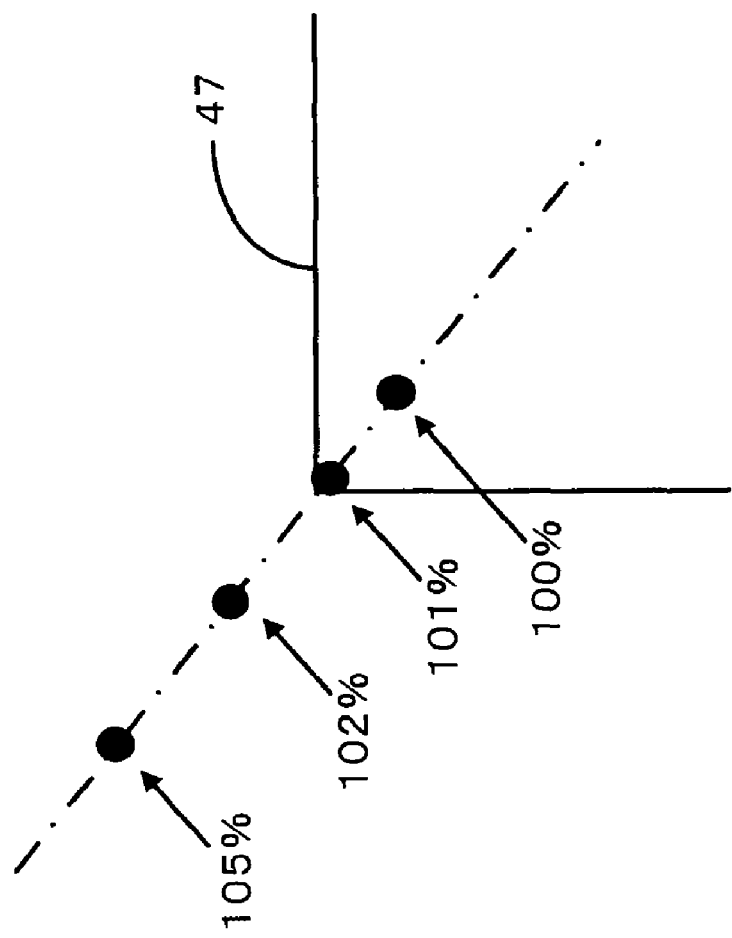
FIG. 12 is a drawing showing, in the context of a QUASI-BORDERLESS COPY MODE, a plurality of print start locations respectively corresponding to a plurality of copy magnifications settable based on printer margin 45C.

Furthermore, at the start of copying (step S0), in the event that the mode specified by the user is COMPLETELY BORDERLESS COPY MODE (COMPLETELY BORDERLESS COPY MODE at S1), flow of processing might be as follows (note that the following description is made with reference to FIG. 12 and with reference to FIG. 7).

That is, an image of the original placed on the original stage is first scanned (S4), and scan image 80 is acquired. In addition, this scan image 80 is enlarged consistent with completely-borderless-copy printer margin 45B (e.g., −3 mm) (S5). Print start location(s) of enlarged scan image(s) 80A is/are adjusted based on calculation and/or preprepared table(s) as described above (S8), and enlarged scan image(s) 80A is/are thereafter printed on printing paper 47 (S9).

Furthermore, at the start of copying (step S0), in the event that the mode specified by the user is QUASI-BORDERLESS COPY MODE (QUASI-BORDERLESS COPY MODE at S1), flow of processing might be as follows (note that the following description is made with reference to FIG. 13 and with reference to FIGS. 9 through 11).

That is, an image of the original placed on the original stage is first scanned (S11), and scan image 80 is acquired. In addition, the size of this scan image 80 is corrected (i.e., is enlarged somewhat (e.g., enlarged at some magnification between 101% and 105%) or specific portion(s) is/are cropped away therefrom) consistent with quasi-borderless-copy printer margin 45C (quasi-borderless-copy printer margin 45C being, e.g., some value within the range from +3 mm to −3 mm) which may have been set in advance or which may be calculated at this time, i.e., at the time of copying, using a prescribed algorithm (S7) (but note that correction is unnecessary in the special case where the size of quasi-borderless-copy printer margin 45C is the same as the size of scanner margin 41). Print start location(s) of the size-corrected image (s) is/are adjusted based on calculation and/or preprepared table(s) as described above (S8), and the size-corrected image (s) is/are thereafter printed on printing paper 47 (S9). The foregoing is a sequence of operations in connection with copying such as might be carried out in the context of a multimode hybrid printer associated with the present embodiment.

Moreover, in this sequence of operations, if the sizes of original 43 and paper 47 are different, the multimode hybrid printer might automatically adjust copy magnification (i.e., might automatically adjust the size of the image of the scanned original) based on the difference in sizes of original 43 and paper 47 (the respective sizes of original 43 and paper 47 may be identified by means of prescribed sensor(s) and/or may be identified as a result of communication by the user).

Figure 14:
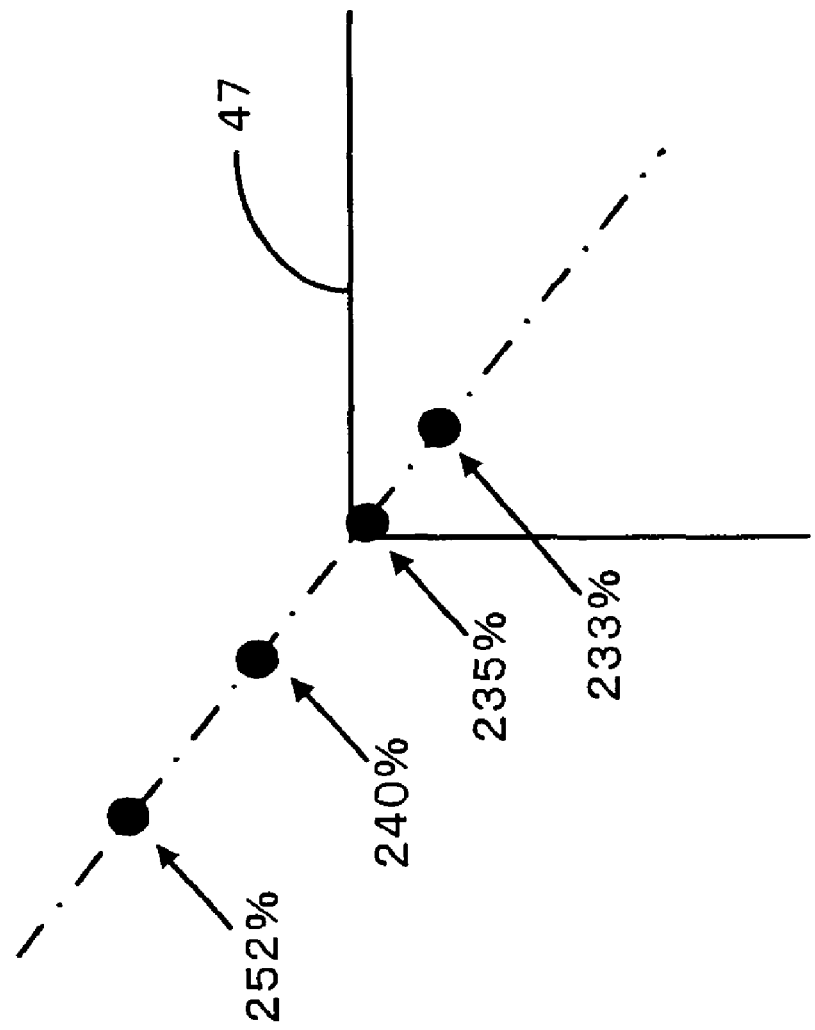
FIG. 14 is a drawing showing, during adjustment of copy magnification by page fitting functionality in the context of a QUASI-BORDERLESS COPY MODE, a plurality of print start locations respectively corresponding to a plurality of copy magnifications settable based on printer margin 45C.

If, for example, original 43 is photograph size L and paper 47 is size A4, copy magnification might be set to 233% in order to permit proper normal copying of the image of original 43 onto the entirety of paper 47 (such functionality will hereinafter be referred to as "page fitting functionality"). In such a case, in order to adjust quasi-borderless-copy printer margin 45C within the aforementioned range (i.e., within the range from normal-copy printer margin 45A to completely-borderless-copy printer margin 45B), the multimode hybrid printer might in QUASI-BORDERLESS COPY MODE further adjust within a specific range (e.g., within a range from 233% to 252%) the copy magnification of "233%" which was obtained as a result of the foregoing adjustment. As shown in FIG. 14, the print start location of the scan image which has been corrected in size based on adjusted magnification may be adjusted based on calculation and/or preprepared table(s) (table(s) recording respective print start location(s) corresponding to respective magnification(s)).

Furthermore, in the foregoing sequence of operations, where COMPLETELY BORDERLESS COPY MODE and/or QUASI-BORDERLESS COPY MODE has been specified despite the fact that size(s) of printing paper 47 specified by user(s) is/are not size(s) accommodating borderless printing, message(s) to the effect that specified copy mode(s) cannot be executed might be displayed at display screen(s) at control panel(s).

Furthermore, in the foregoing sequence of operations, where copy magnification(s) greater than unity magnification (i.e., for enlarged copy or copies) and/or copy magnification (s) less than unity magnification (i.e., for reduced copy or copies) have been specified by user(s), size(s) of scan image (s) 80 may be enlarged and/or reduced based on such copy magnification(s). In the event that enlarged and/or reduced image(s) of scanned original(s) do not fit within print region (s) as defined by printer margin(s) 45A, 45B, and/or 45C in any of the several foregoing copy modes, it or they may be corrected in size (i.e., it or they may be reduced and/or portion (s) extending beyond print region(s) may be cropped off therefrom) so as to cause it or they to fit within the print region(s). On the other hand, in the event that enlarged and/or reduced scan image(s) do fit within print region(s) as defined by printer margin(s) 45A, 45B, and/or 45C, it or they may be printed at the approximate center of printing paper 47 either without further modification—there being no particular occasion for size correction—or after first being enlarged to size (s) matching such print region(s).

Furthermore, in the foregoing sequence of operations, the multimode hybrid printer might accept selection with respect to which is to be given priority: specified copy magnification (s) (and/or copy magnification(s) calculated by means of page fitting functionality) or specified copy mode(s). In such case, in the event that it is selected that priority should be given to copy magnification(s), the multimode hybrid printer would print scan image(s) 80 as corrected in size in accordance with specified copy magnification(s) without further modification even where, as a result of correction of size(s) of such image (s) in accordance with such copy magnification(s), printing of size-corrected image(s) without further modification would make it impossible to successfully execute user-specified copy mode(s) (e.g., where printing would result in formation of margin-like space(s) despite the fact that COMPLETELY BORDERLESS COPY MODE was specified). On the other hand, in the event that it is specified that priority should be given to copy mode(s), if printing of image(s) as corrected in size in accordance with user-specified copy magnification(s) without further modification would make it impossible to successfully execute user-specified copy mode(s) (e.g., when printing would result in formation of margin-like space(s) despite the fact that COMPLETELY BORDERLESS COPY MODE has been specified), the multimode hybrid printer would further correct size(s) of size-corrected image(s) so as to make it possible to successfully execute user-specified copy mode(s) before printing same.

As described above, in accordance with the foregoing second embodiment, it is possible for scanner margin 41 to be set to a small size consistent with the high mechanical precision of the scanner mechanism rather than being set so as to be equal in size to the large printer margin 45A employed for normal copying. This makes it possible to carry out borderless copying at magnification(s) closer to that or those desired by user(s) (e.g., unity magnification) than would be the case were conventional borderless-printing printer technology to be applied without modification to a conventional hybrid printer.

Furthermore, in accordance with the foregoing second embodiment, a mode, i.e., QUASI-BORDERLESS COPY MODE, for carrying out copying in a fashion that is intermediate between normal copying and completely borderless copying is available. In quasi-borderless copy mode, the size of scan image 80 is corrected so as to be larger than would be the case for normal copying but smaller than would be the case for completely borderless copying. This being the case, it is possible to carry out completely borderless copying at magnification(s) closer to magnification(s) desired by user(s) (e.g., unity magnification).

Moreover, variations such as the following could also be contemplated in connection with this second embodiment.

Figure 15:
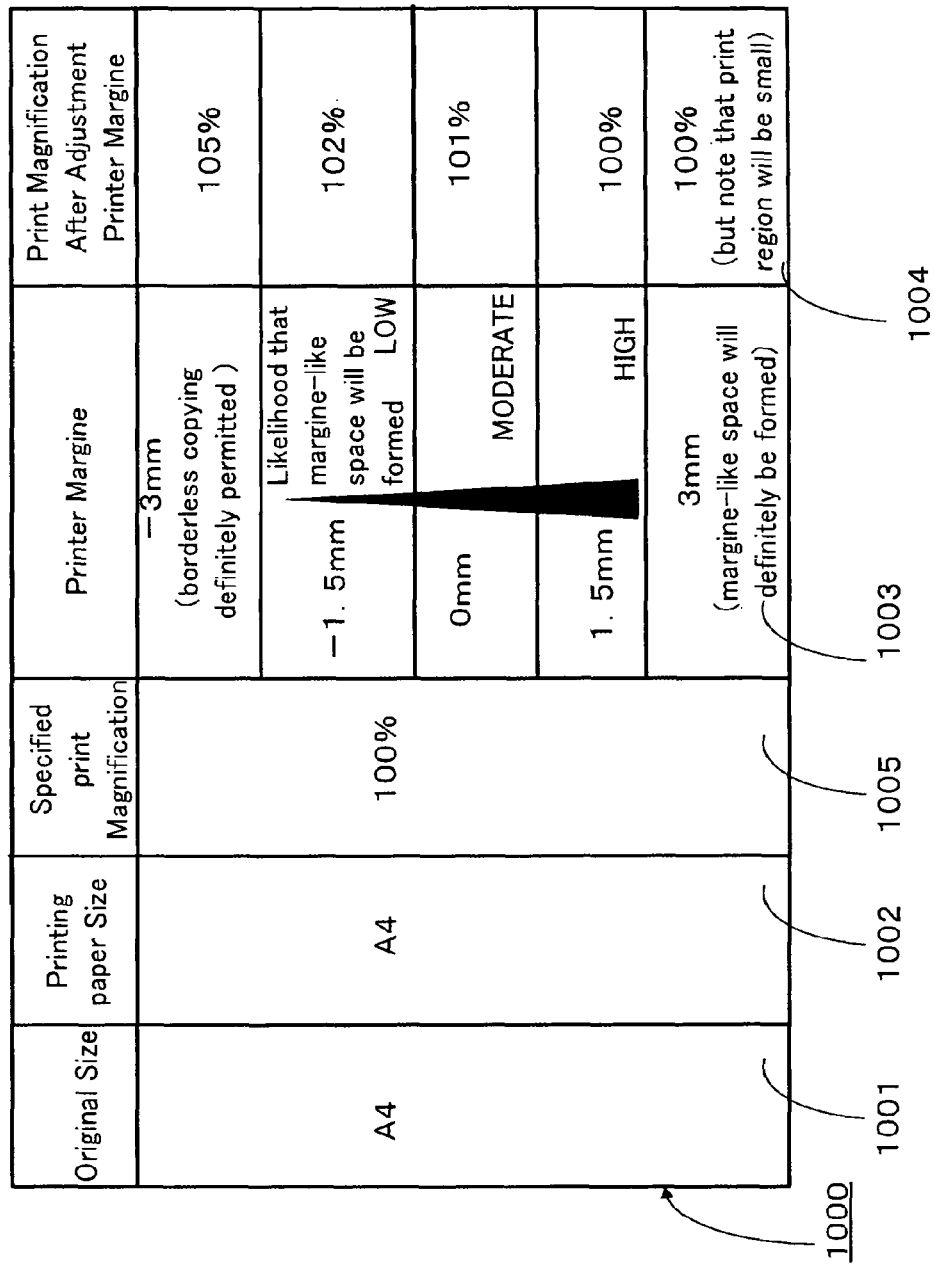
FIG. 15 is a drawing showing an example of a printer margin adjustment screen.

To wit, printer margin adjustment screen 1000 such as that shown by way of example in FIG. 15 might be displayed at a control panel of the multimode hybrid printer (or if a host apparatus is connected to the multimode hybrid printer, at a display screen of the host apparatus). Printer margin adjustment screen 1000 may be employed to freely adjust printer margin(s) so as to be within prescribed range(s). Below, printer margin adjustment screen 1000 is described in detail (note, moreover, that scanner margin in the present embodiment is assumed to be "1.5 mm").

Printer margin adjustment screen 1000 is provided with original size display area(s) 1001, specified print magnification display area(s) 1005, printing paper size display area(s) 1002, printer margin adjustment area(s) 1003, and print-magnification-after-adjustment-of-printer-margin display area(s) 1004.

Displayed at original size display area 1001 is/are size(s) of original(s) placed on original stage(s) 60. Moreover, original size(s) displayed at this original size display area 1001 may be automatically identified by the multimode hybrid printer and/or may be manually input by user(s).

Displayed at printing paper size display area 1002 is/are size(s) of paper on which printing is to be carried out as contained in current settings.

Displayed at specified print magnification display area 1005 is/are print magnification(s) (e.g., 100%) as manually specified by user(s). Moreover, in the event that, for example, original size(s) displayed at original size display area 1001 and printing paper size(s) displayed at printing paper size display area 1002 are different, print magnification(s) displayed at this area 1005 may be print magnification(s) as automatically adjusted by page fitting functionality.

Displayed at printer margin adjustment area 1003 in touch panel fashion or in other such fashion as to permit selection thereamong are a plurality of (e.g., five) printer margins. Furthermore, also displayed at printer margin adjustment area 1003 for each of the plurality of selectable printer margins is a description of what printing would be like if printing were to actually be carried out with that printer margin (this need only be some emblematic representation on the like sufficient to convey a sense of what printing would be like for each).

Displayed at print-magnification-after-adjustment-of-printer-margin display area 1004 are a plurality of (e.g., five) print magnifications as would result after adjustment of printer margin, these respectively corresponding to the aforementioned plurality of printer margins. "Print magnification after adjustment of printer margin" shows how printer margin settings affect print magnification for a given specified print magnification. Taking the situation depicted in the drawing, in the event, for example, that 100% printing (i.e., printing at unity magnification) is specified, selecting a printer margin of "1.5 mm"—this being identical in size to the scanner margin of "1.5 mm"—might result in display to the effect that 100% printing will definitely be possible. But despite the fact, for example, that 100% printing has been specified, setting printer margin to "−3 mm"—this being considerably different from the scanner margin of "1.5 mm"—might result in display to the effect that print magnification will increase to 105%. When specified print magnification (i.e., print magnification displayed at specified print magnification display area 1005) is changed, the respective print magnifications as would result after adjustment of printer margin which are displayed at print-magnification-after-adjustment-of-printer-margin display area 1004 are automatically changed in correspondence thereto.

In accordance with the present embodiment, the user can, at this printer margin adjustment screen 1000, select desired printer margin(s) from among a plurality of printer margins, with copying being carried out consistent with the selected printer margin(s). This makes it possible to accurately obtain copy results as desired.

Note also that the manner of printer margin adjustment need not be limited to that shown in FIG. 15. For example, adjustment may be accomplished by means of increase and/or decrease in prescribed increments.

A great many variations are possible with respect to the foregoing embodiments. For example, the printer mechanism employed in the hybrid printer is not limited to that of an inkjet printer, it being possible to employ that of other types of printer; e.g., that of a laser printer. Furthermore, paper size(s) for which it is possible to carry out borderless printing is/are not limited to the three presented above. Either a greater number or a lesser number of such size(s) is possible (for example, print mechanism(s) and the like may be constituted in such fashion as to permit photograph size L and/or photograph size 2L to be paper size(s) for which it is possible to carry out borderless printing).

Figure 16:
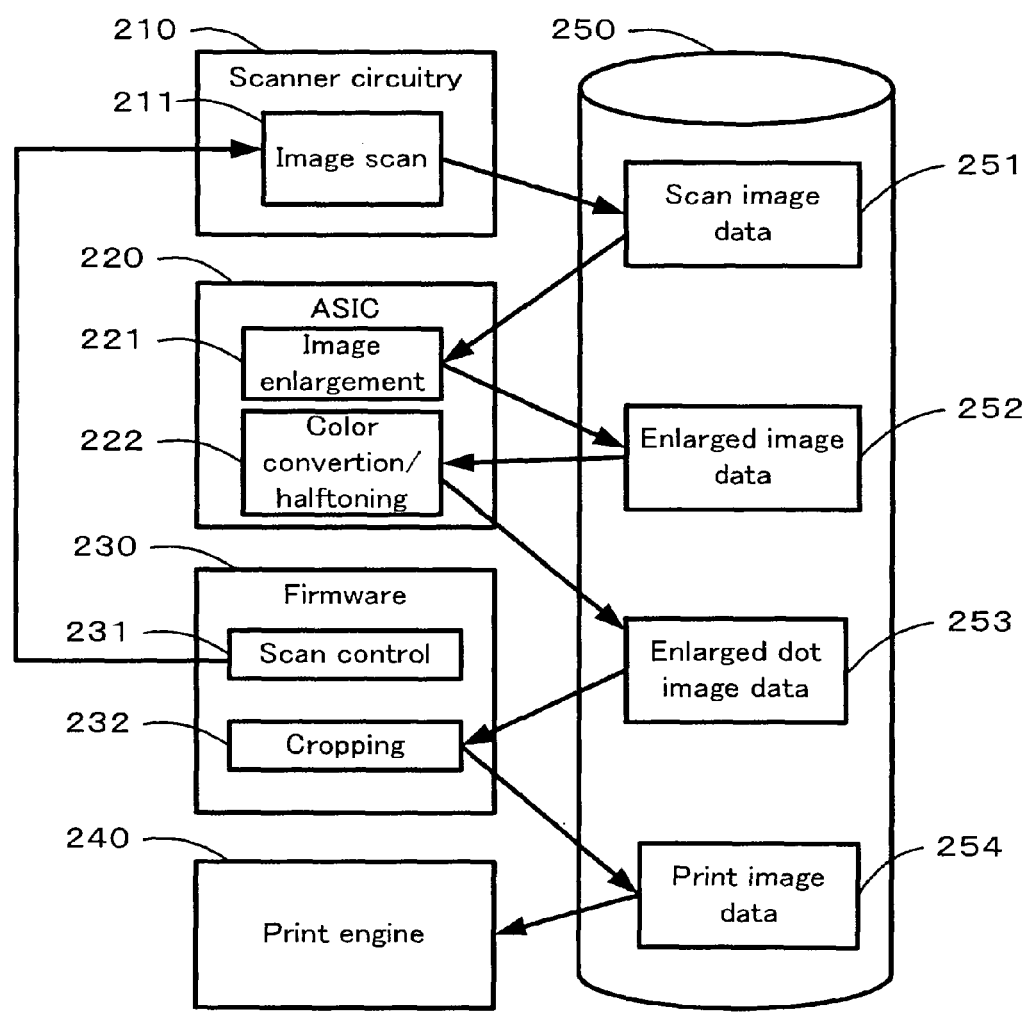
FIG. 16 is a block diagram showing constitution and function of the principal parts of a hybrid printer associated with a third embodiment of the present invention.

FIG. 16 shows constitution and function of the principal parts of a third embodiment of a hybrid printer in accordance with the present invention.

This hybrid printer has mechanical construction as is shown in FIG. 1; furthermore, as shown in FIG. 16, there are at the interior thereof scanner circuitry 210, ASIC(s) (Application Specific IC(s)) 220, firmware (i.e., microprocessor(s) executing firmware) 230, print engine(s) 240, and storage device(s) 250.

Scanner circuitry 210 carries out image scan processing 211, scanning in image(s) of original(s) placed on original stage(s). At such time, firmware 230 carries out scan control 231, controlling image scan processing 211 so as to cause scanning of scan region(s) determined in correspondence to original size(s) specified by user(s). Original scan image data 251 output from scanner circuitry 210 is temporarily stored in storage device(s) 250 such as, for example, RAM and/or hard drive(s).

ASIC 220 reads scan image data 251 from storage device 250 and moreover carries out image enlargement processing 221, enlarging such scan image data 251 by a certain amount (e.g., enlargement might be 105% when original size is A4, enlargement might be 109% when original size is Japanese postcard size, etc.). Enlarged image data 252 is temporarily stored in storage device 250. ASIC 220 thereafter reads enlarged image data 252 from storage device 250 and moreover carries out color conversion/halftoning processing 222, converting such enlarged image data 252 (e.g., RGB full-color image data) into enlarged dot image data 253 (e.g., CMYK binary image data) by means of which the initial image is represented in simulated fashion through employment of an ink dot matrix. Enlarged dot image data 253 is temporarily stored in storage device 250. It so happens that in the present embodiment ASIC(s) is/are employed for carrying out image enlargement processing 221 and color conversion/halftoning processing 222, but this need not be the case, that being merely presented by way of example. It is also possible to carry out either image enlargement processing 221 or color conversion/halftoning processing 222, or both image enlargement processing 221 and color conversion/halftoning processing 222, by, for example, executing firmware or other such computer program instead of or in combination with ASIC(s).

Firmware 230 reads enlarged dot image data 253 from storage device 250 and moreover carries out cropping processing 232, extracting as effective print image data 254 the portion(s) remaining after deletion of unwanted perimeter portion(s) from enlarged dot image data 253. Extracted print image data 254 is temporarily stored in storage device 250 and is thereafter transferred to print engine 240. Print engine 240 uses print image data 254 to drive printhead(s), as a result of which printout(s) is/are created.

Figure 17:
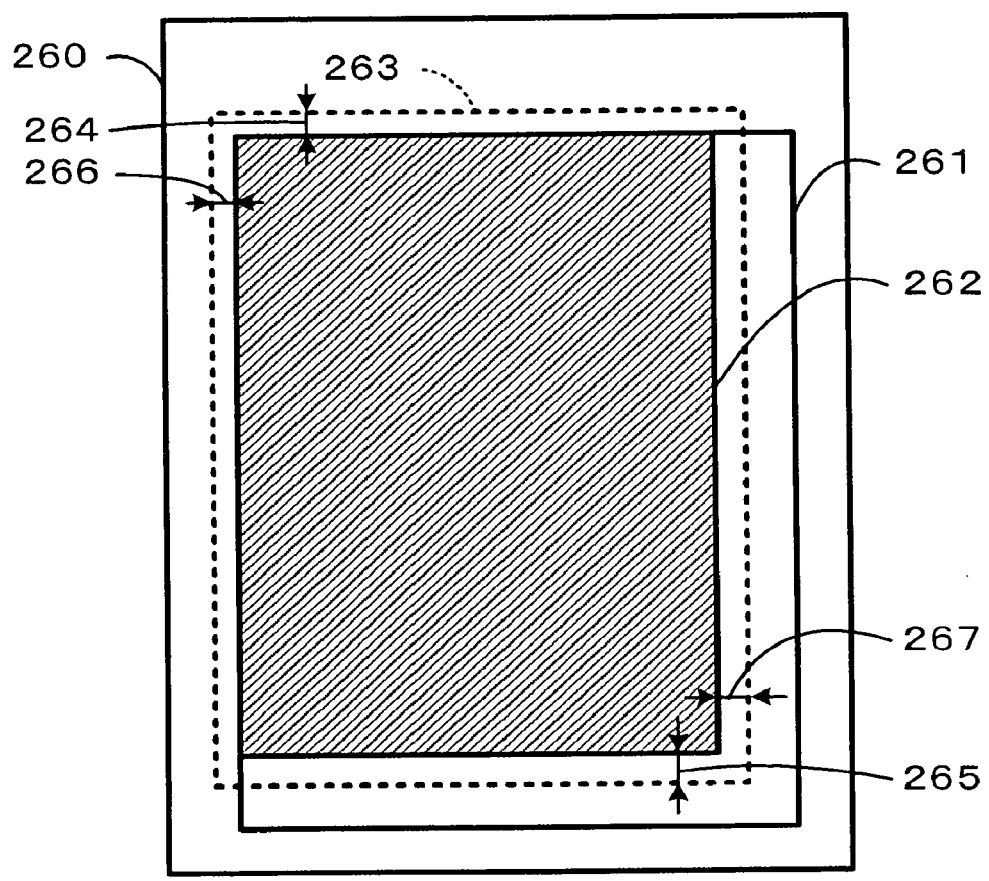
FIG. 17 is a plan view of an original stage for explaining a scan region in the context of four-sided borderless copying at a hybrid printer associated with the third embodiment.

FIG. 17 shows a plan view of an original stage for explaining original stage scan region(s) scanned by means of scanner circuitry 210 in a situation where four-sided borderless copying is being carried out.

At FIG. 17, reference numeral 260 indicates an original stage frame, this frame being constituted by the hybrid printer housing. Captured within this frame 260 is plate glass original stage 261. A user might place an original of desired size on glass original stage 261, and might specify to the hybrid printer that the size of the original so placed is, for example, A4 or B5. While hybrid printer might not directly know the size or location of the original actually placed on glass original stage 261, it might assume that an original 262 of size as specified by the user has been placed on glass original stage 261 at standard location and in standard orientation (e.g., as shown by way of example in FIG. 17, at such location and in such orientation as to cause the upper left corner, top (short) edge, and left (long) edge of that original 262 to respectively match the upper left corner, top (short) edge, and left (long) edge of glass original stage 261). An original 262 assumed to exist in this fashion will hereinafter be distinguished from an actual original by referring to same as an "assumed original."

Enlarging the region occupied by assumed original 262 on glass original stage 261 somewhat outward therefrom so as to accommodate top, bottom, left, and right margins 264, 265, 266, and 267 of prescribed dimension(s), the hybrid printer establishes such enlarged region 263 as scan region. In other words, scan region 263 is established in such manner as to cause assumed original 262 to be completely enclosed by scan region 263 with sufficient clearance therebetween to accommodate top, bottom, left, and right margins 264, 265, 266 and 267. By thus causing scan region 263 to be established such that it is larger by appropriate amount(s) than assumed original 262, the actual original will in most cases, so long as the size of the actual original placed on original stage 261 matches the size specified by the user, lie within the actual scan region (meaning that the entire region of the actual original will be scanned) despite any slight deviation which may exist in the position of the actual scan region relative to established scan region 263 attributable to the mechanical precision of the scanner mechanism and/or despite what could be moderate deviation in the orientation and location of the actual original relative to standard orientation and location. A value of 1.5 mm might, for example, be employed for top and left margins 264 and 266; a value of 3 mm might, for example, be employed for bottom and right margins 265 and 267.

The hybrid printer scans scan region 263, which is somewhat larger than assumed original 262 as has been described, the image data corresponding to this scan region 263 being output as scan image data 251 shown in FIG. 16. As described above, the scan image data 251 which is so output will in most cases contain image data for the entire region of the actual original placed on glass original stage 261.

Figure 18:
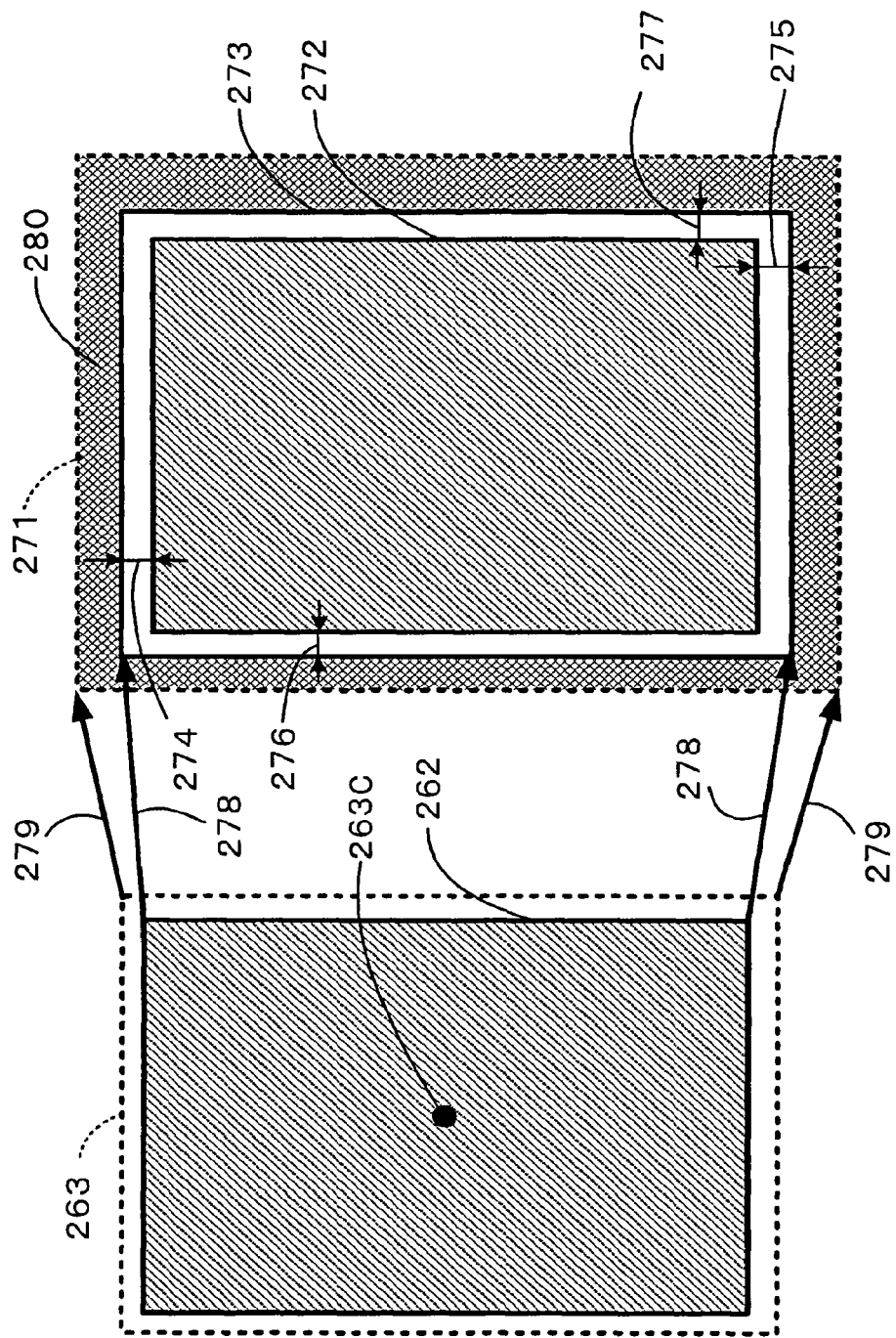
FIG. 18 is a drawing showing image size for explaining image enlargement processing 221 and cropping processing 232 in the context of four-sided borderless copying at a hybrid printer associated with the third embodiment.

FIG. 18 is a drawing showing image size(s) for explaining image enlargement processing 221 and cropping processing 232 in the context of four-sided borderless copying.

As indicated by arrow 279 in FIG. 18, during image enlargement processing 221, image data corresponding to scan region 263 (scan image data 251 at FIG. 16) is enlarged at prescribed enlargement about center point 263C thereof, transforming it into image data of size as indicated at region (hereinafter "enlarged scan region") 271 shown in the drawing. Image data corresponding to this enlarged scan region 271 is the enlarged image data 252 shown in FIG. 16. Within the image data corresponding to this enlarged scan region 271, image data corresponding to initial assumed original 262 is enlarged, as indicated by arrow 278, to become image data of size as at region (hereinafter "enlarged paper region") 273, which is somewhat larger in size than print media (printing paper) 272 previously specified by the user. This enlarged paper region 273 is equal to a size obtainable by enlarging the size of print media 272 outward by amount(s) sufficient to accommodate top, bottom, left, and right printer margins 274, 275, 276, and 277 of prescribed dimension(s).

Thereafter, during cropping processing 232, that portion 280 (indicated by cross-hatching at FIG. 18) of the image data corresponding to enlarged scan region 271 that lies to the exterior of enlarged paper region 273 is deleted, only the image data corresponding to enlarged paper region 273 being extracted therefrom. The image data corresponding to enlarged paper region 273 extracted in this fashion is the print image data 254 shown in FIG. 16. This print image data 254 is transferred to print engine 340, where it is used to drive the printhead.

As described above, print image data 254 (image data corresponding to enlarged paper region 273) is equal to a size obtainable by enlarging the size of print media 272 outward by amount(s) sufficient to accommodate top, bottom, left, and right printer margins 274, 275, 276, and 277 of prescribed dimension(s). As a result, even if the position of the actual print media as supplied to the platen deviates somewhat from the standard position therefor due to the mechanical precision of the paper feed mechanism of print engine 340, the actual print media will in most cases lie completely within the region (enlarged paper region 273) on the platen occupied by the print image data, this being the region which is scanned by the printhead. As a result, four-sided borderless copying is made possible. Here, as specific examples of the dimensions of the aforementioned top, bottom, left, and right printer margins 274, 275, 276, and 277, 3 mm may be employed therefor.

While it need not always be so, the size of the original and the size of the print media will in many cases be the same. Where the two are the same, specific examples of values of enlargements employable during image enlargement processing 221 might be 105% where the specified size of the original is for example standard A4 size (210 mm×297 mm), or 109% where the specified size of the original is for example the Japanese postcard size (100 mm×148 mm).

Figure 19:
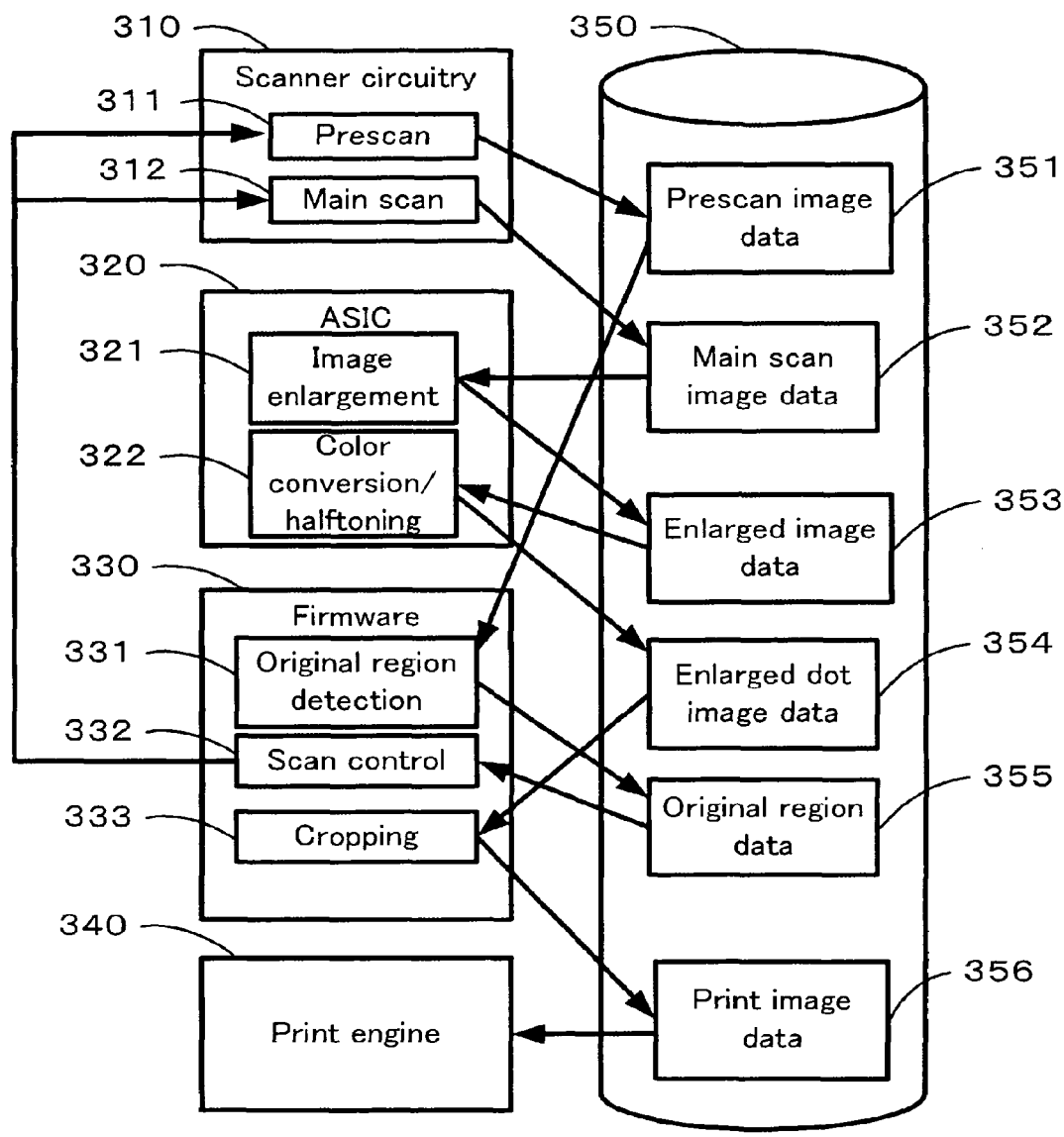
FIG. 19 is a block diagram showing constitution and function of the principal parts in an embodiment of a hybrid printer associated with a fourth embodiment of the present invention.

FIG. 19 shows constitution and function of the principal parts of a fourth embodiment of a hybrid printer in accordance with the present invention.

This hybrid printer has mechanical construction as is shown in FIG. 1; furthermore, as shown in FIG. 19, there are at the interior thereof scanner circuitry 310, ASIC(s) (Application Specific IC(s)) 320, firmware (i.e., microprocessor(s) executing firmware) 330, print engine(s) 340, and storage device(s) 350.

Scanner circuitry 310 is capable of carrying out prescan processing 311 and/or main scan processing 312 in manual and/or automatic fashion. In the event that four-sided borderless copying is to be carried out, scanner circuitry 310 might automatically carry out prescan processing 311 and main scan processing 312, in this order, in continuous and automated fashion. At time(s) when prescan processing 311 and/or main scan processing 312 is/are being carried out, firmware 330 carries out scan control 332, controlling scan region (s) and resolution(s) in connection with the respective types of processing.

During prescan processing 311, the entire region which could conceivably be occupied by original(s) (e.g., the entire region of the glass original stage) is scanned at high speed at some prescribed low resolution (e.g., 50 dpi). Prescan image data 351 corresponding to the entire original stage and obtained as a result of prescan processing 311 is temporarily stored in storage device(s) 350 such as, for example, RAM and/or hard drive(s).

After prescan processing 311 has been carried out, firmware 330 reads prescan image data 351 from storage device 350 and moreover carries out original region detection processing 331 with respect to prescan image data 351, detecting region(s) on the original stage at which actual original(s) exist.

Any of a variety of methods may be employed as method for original region detection processing 331. The procedure listed at (1) through (5), below, represents one of such methods, which is presented here by way of example.

(1) Brightness values of respective pixels of prescan image data 351 are binarized based on prescribed threshold(s). Where, for example, brightness values range from 0 to 255, a threshold of 210 might, for example, be employed.

(2) The binary prescan image data 351 is subjected to downsampling. For example, each 4×4=16 pixels of binary prescan image data 351 can, by subjecting same to OR operation(s), be converted into 1 pixel of downsampled binary prescan image data 351. In this example, the resolution of binary prescan image data 351 is reduced to one-fourth of its initial resolution. Note that, hereinafter, the initial resolution of binary prescan image data 351 will be referred to as the second resolution thereof, and the resolution obtained as a result of downsampling will be referred to as the first resolution thereof.

(3) First-resolution binary prescan image data 351 obtained by downsampling is subjected to labeling processing. While it is possible to use any of a variety of algorithms for labeling processing, as one example thereof, two-pass-type labeling processing based on 8-connectivity might be employed. As a result of labeling processing, groups of mutually connected pixels for which pixel value is equal to 1 (labeled region(s) of pixel value 1) are extracted from first-resolution binary prescan image data 351.

(4) Labeled region(s) which have been extracted are subjected to noise reduction processing, noise region(s) present due to inclusion of dirt, dust, and/or the like during prescan of the original being removed from labeled region(s).

(5) Following noise reduction processing, the smallest rectangular region that completely encompasses the labeled region(s) is extracted as the original region.

After the original region has been detected within prescan image data 351 in such fashion, original region data 355 indicating the position of that original region on the original stage is temporarily stored at storage device 350. Prescan image data 351 is deleted from storage device 350.

Main scan processing 312, performed by scanner circuitry 310, is automatically executed thereafter. During main scan processing 312, firmware 330 uses original region data 355 to control the scan region so as to cause the entire expanse of the detected original region to be completely scanned (in other words, so as to cause the detected original region to be completely enclosed by the scan region). Here, the scan region may be controlled so as to cause it to exactly match the detected original region or may be controlled so as to cause it to be somewhat larger than the detected original region as sufficient to accommodate prescribed scanner margin(s). Main scan image data 352 obtained as a result of main scan processing 312 is temporarily stored at storage device 350.

ASIC 320 reads main scan image data 352 from storage device 350 and moreover carries out image enlargement processing 321, enlarging main scan image data 352 by a certain amount. Enlarged image data 352 is temporarily stored in storage device 350. ASIC 320 thereafter reads enlarged image data 353 from storage device 350 and moreover carries out color conversion/halftoning processing 322, converting such enlarged image data 353 (e.g., RGB full-color image data) into enlarged dot image data 354 (e.g., CMYK binary image data) by means of which the initial image is represented in simulated fashion through employment of an ink dot matrix. Enlarged dot image data 354 is temporarily stored in storage device 350. Note that either image enlargement processing 321 or color conversion/halftoning processing 322, or both image enlargement processing 321 and color conversion/halftoning processing 322, may be carried out by, for example, executing firmware or other such computer program instead of or in combination with ASIC(s).

Firmware 330 reads enlarged dot image data 354 from storage device 350 and moreover carries out cropping processing 333, deleting unwanted perimeter portion(s) from enlarged dot image data 354 and extracting as effective print image data 356 the portion(s) which remain. Extracted print image data 356 is temporarily stored in storage device 350 and is thereafter transferred to print engine 340. Print engine 340 uses print image data 356 to drive printhead(s), as a result of which printout(s) is/are created.

Figure 20:
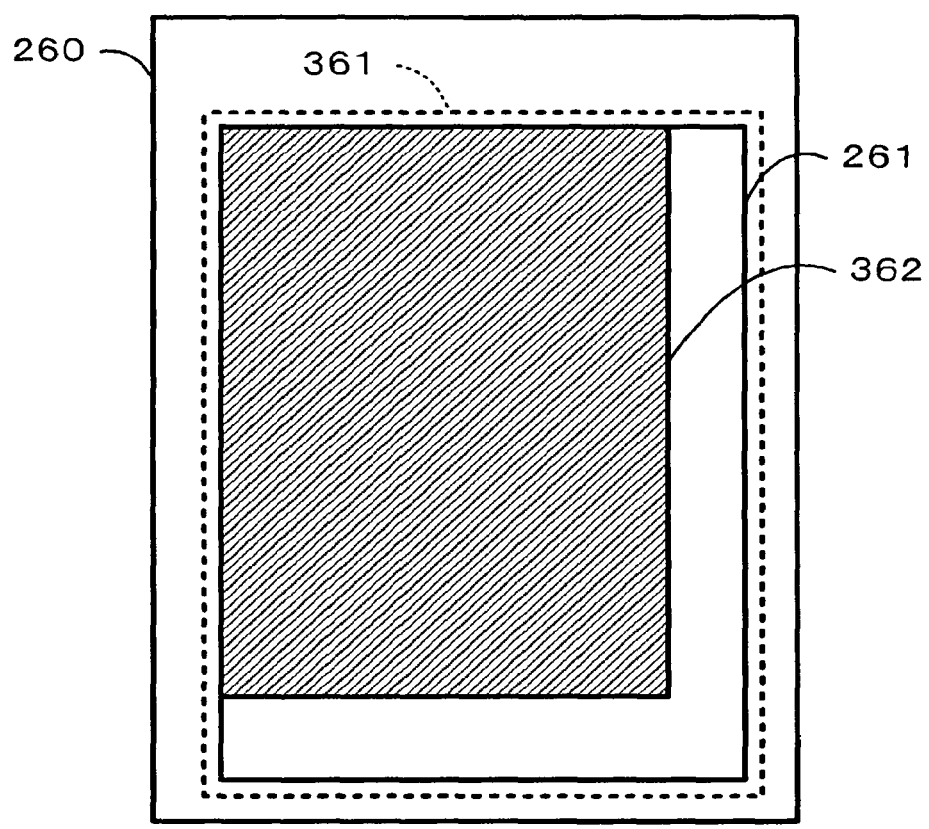
FIG. 20 is a plan view of an original stage for explaining an original stage scan region during prescan and during main scan in the context of four-sided borderless copying at a hybrid printer associated with the fourth embodiment.

FIG. 20 shows a plan view of an original stage for explaining scan region(s) in connection with prescan and main scan in the context of four-sided borderless copying.

At FIG. 20, plate glass original stage 261 is captured within original stage frame 260, this frame being constituted by the hybrid printer housing. A user might place an original 362 of desired size on glass original stage 261, and might request that the hybrid printer carry out four-sided borderless copying. Upon so doing, the hybrid printer might carry out the aforementioned prescan processing 311. The scan region employed during prescan processing 311 is set so as to be a region which includes the entire region that could conceivably be occupied by original(s) 362, e.g., a region 361 somewhat larger than glass original stage 261. The hybrid printer scans this prescan scan region 361 at high speed and outputs image data corresponding to this scan region 361 (prescan image data 351 at FIG. 19).

Next, the aforementioned original region detection processing 331 is carried out, actual original region 362 being detected within scan region 361. The aforementioned main scan processing 312 is thereafter carried out, detected original region 362 being scanned. While the scan region employed during main scan processing 312, even when found to be exactly identical to original region 362, may be made somewhat larger than same in order to accommodate prescribed scanner margin(s) (i.e., the only requirement here being that original region 362 be completely enclosed by scan region 263), the description which follows is, for convenience of description, predicated upon a situation in which a scan region exactly identical to original region 362 is employed.

Figure 21:
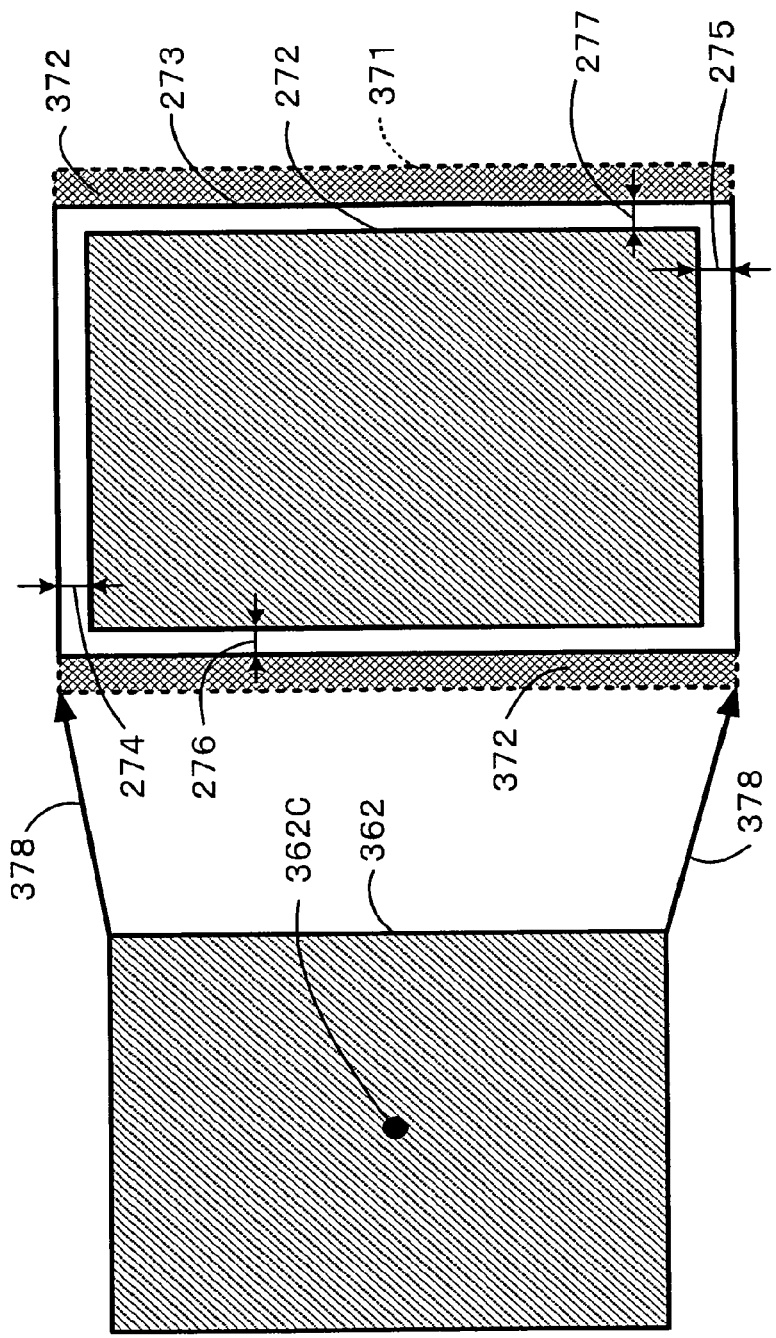
FIG. 21 is a drawing showing image size for explaining image enlargement processing 321 and cropping processing 333 in the context of four-sided borderless copying at a hybrid printer associated with the fourth embodiment.

FIG. 21 is a drawing showing image size(s) for explaining image enlargement processing 321 and cropping processing 333 in the context of four-sided borderless copying.

As indicated by arrow 378 in FIG. 21, during image enlargement processing 321, image data corresponding to original region 362 (main scan image data 352 at FIG. 19) is enlarged about center point 362C thereof, transforming it into image data of size such as that of region (hereinafter referred to as "enlarged original region") 371 shown in the drawing. Image data corresponding to this enlarged original region 371 is the enlarged image data 353 shown in FIG. 19. The horizontal dimension or the vertical dimension (preferably whichever is shorter) of this enlarged original region 371 is equal to that of a region (hereinafter "enlarged paper region") 273 somewhat larger than print media (printing paper) 272 previously specified by the user. This enlarged paper region 273 is equal to a size obtainable by enlarging the size of print media (printing paper) 272 outward by amount(s) sufficient to accommodate top, bottom, left, and right printer margins 274, 275, 276, and 277 of prescribed dimension(s). In the event that the aspect ratio of original region 362 is the same as that of print media 272, enlarged original region 371 will match enlarged paper region 273. But where, as at the example shown in FIG. 21, the aspect ratio of original region 362 is different from that of print media 272, enlarged original region 371 will be larger, in the horizontal or the vertical dimension, than enlarged paper region 273. Here, as specific examples of the dimensions of the aforementioned top, bottom, left, and right printer margins 274, 275, 276, and 277, 3 mm may be employed therefor.

Thereafter, during cropping processing 333, that portion 372 (indicated by cross-hatching at FIG. 21) of the image data corresponding to enlarged original region 371 that lies to the exterior of enlarged paper region 273 is deleted, only the image data corresponding to enlarged paper region 273 being extracted therefrom. The image data corresponding to enlarged paper region 273 extracted in this fashion is the print image data 356 shown in FIG. 21. This print image data 356 is transferred to print engine 340, where it is used to drive the printhead.

It so happens, where original(s) is/are placed on original stage(s) 12, that each of the hybrid printers associated with the foregoing first through fourth embodiments establishes scan region(s) based on the original(s) itself or themselves. However, in a variation thereof, a hybrid printer might establish scan region(s) based not on the original(s) itself or themselves, but based on region(s) which is/are subset(s) of original stage(s); particularly region(s) at which specific copy subject(s) within original(s) is/are discernible (e.g., specific character(s), character string(s), photograph(s), picture(s), graphic(s), any combination hereof, etc.). FIG. 24 shows such an example. As shown in FIG. 24, character string 640 and/or photograph (or picture) (indicated by cross-hatching) 641 might, for example, be discernible within original 600. There are situations in which the copy subject might be not all of original 600 but only, for example, character string 640 and/or only photograph 641. For example, where the copy subject is only character string 640, the hybrid printer might identify region 644 corresponding to character string 640 within original 600, and might establish scan region 646 and/or 648 based on this character string region 644. At such time, the hybrid printer may establish scan region 646 which matches or is slightly larger than region 644 corresponding to character string 640, and/or may establish scan region 648 which is slightly smaller than region 644 corresponding to character string 640. Furthermore, where for example the copy subject is only photograph 641, the hybrid printer might identify region 642 corresponding to photograph 641 within original 600, and might establish scan region 650 and/or 652 based on this photograph region 642. At such time, the hybrid printer may establish scan region 650 which matches or is slightly larger than photograph region 642, and/or may establish scan region 652 which is slightly smaller than photograph region 642. In order to thus establish scan region(s) based not on region(s) corresponding to original(s) 600 itself or themselves but based on region(s) corresponding to copy subject (s), it is necessary for the hybrid printer to identify in advance where region(s) corresponding to copy subject(s) is/are within original(s). To this end, the hybrid printer may employ method(s) in which region(s) corresponding to copy subject (s) is/are detected, and/or method(s) in which region(s) corresponding to copy subject(s) is/are specified by user(s). In a method in which the region corresponding to the copy subject is detected, the hybrid printer might automatically detect the copy subject (e.g., character string 640 and/or photograph 641 shown in FIG. 24) by processing an image of the original stage obtained through prescanning, and might deem the smallest rectangular region that would encompass the detected copy subject to be the region corresponding to the copy subject. Furthermore, in a method in which the region corresponding to the copy subject is specified by the user, the hybrid printer might display an image of the original stage obtained through prescanning so as to permit the user to select the copy subject region within the displayed original stage image, and the region selected by the user might be deemed to be the region corresponding to the copy subject. Description of operation and function of hybrid printer 1 in the context of establishment of scan region(s) based on region(s) corresponding to copy subject(s) within original(s) such as has been mentioned may be obtained by reading "copy subject (s)" in place of the term "original" or "original(s)" where these appear within the foregoing description of operation and function of hybrid printers associated with the first through fourth embodiments.

Any of the hybrid printers associated with the foregoing first through fourth embodiments may, in addition to the functionalities described above, also be provided with the following first and/or second functionalities.

The first functionality is a borderless print mode in which image data is input from image-containing-data source(s) other than scanner circuitry, and four-sided and/or two-sided borderless printing of such image data is carried out. What is here referred to as image-containing-data source(s) other than scanner circuitry may include source(s) internal to the hybrid printer and/or source(s) external to the hybrid printer. Image-containing-data source(s) internal to the hybrid printer may, for example, include nonvolatile memory or memories such as EEPROM internal to the hybrid printer, internal hard drive (s) and/or other such data storage device(s), and/or the like. Image-containing-data source(s) external to the hybrid printer may, for example, include personal computer(s) and/or other such host apparatus(es), hard drive(s), digital camera (s), mobile telephone(s), PDA(s), portable recording medium or media (e.g., memory card(s) capable of being installed at the hybrid printer), and/or other such image-containing-data output device(s) capable of being connected to the hybrid printer by way of prescribed communication interface(s) (e.g., USB and/or Bluetooth™).

Selection of borderless copy mode(s) and/or borderless print mode(s) and/or switching therebetween may be controlled in manual fashion by user(s) and/or may be controlled in automatic fashion by the hybrid printer. For example, the hybrid printer might automatically select borderless print mode(s) in response to prescribed event(s) such as when external image-containing-data source(s) is/are communicatably connected thereto and/or when image data is received from such other image-containing-data source(s).

The second functionality is a superposed print mode in which image data obtained as a result of scanning by scanner circuitry and image data input from such image-containing-data source(s) other than scanner circuitry are printed in superposed fashion. Selection of borderless copy mode(s), borderless print mode(s), and/or superposed print mode(s), and/or switching therebetween or thereamong, may be controlled manually by user(s) and/or may be controlled automatically.

In superposed print mode, where four-sided and/or two-sided borderless printing is to be carried out, enlargement processing of scan image data and/or image data input thereinto may be carried out before processing to superpose such data and/or after such data has been superposed. Furthermore, in superposed print mode, additional image operation(s); e.g., additional enlargement and/or reduction processing, various types of filter processing (e.g., color tone correction, conversion from full-color image(s) to monochromatic image(s), alteration of color tone(s), and/or the like), and/or the like may be applied to scan image data, input image data, and/or superposed image data.

Furthermore, in superposed print mode, superposed position setting(s), e.g., what position within input image data is to be aligned with what position within scan image data during superposition, may be controlled in manual fashion by user(s) and/or may be controlled in automatic fashion by the hybrid printer (e.g., the location of the center of the region subject to printing in input image data might automatically be made to coincide with the location of the center of scan image data).

Furthermore, in superposed print mode, input image data may, for example, be photograph image data supplied from image-containing-data source(s), e.g., digital camera(s), external to the hybrid printer, and/or may be ornamental image data previously stored at image-containing-data source (s) internal to the hybrid printer. What is here referred to as "ornamental component image-containing-data" is, for example, data for any of various types of ornamental images such as backgrounds, decorative frames, inset illustrations, and/or other such text, graphics, designs, patterns, and/or other such features capable of being added to print image(s).

Figure 25:
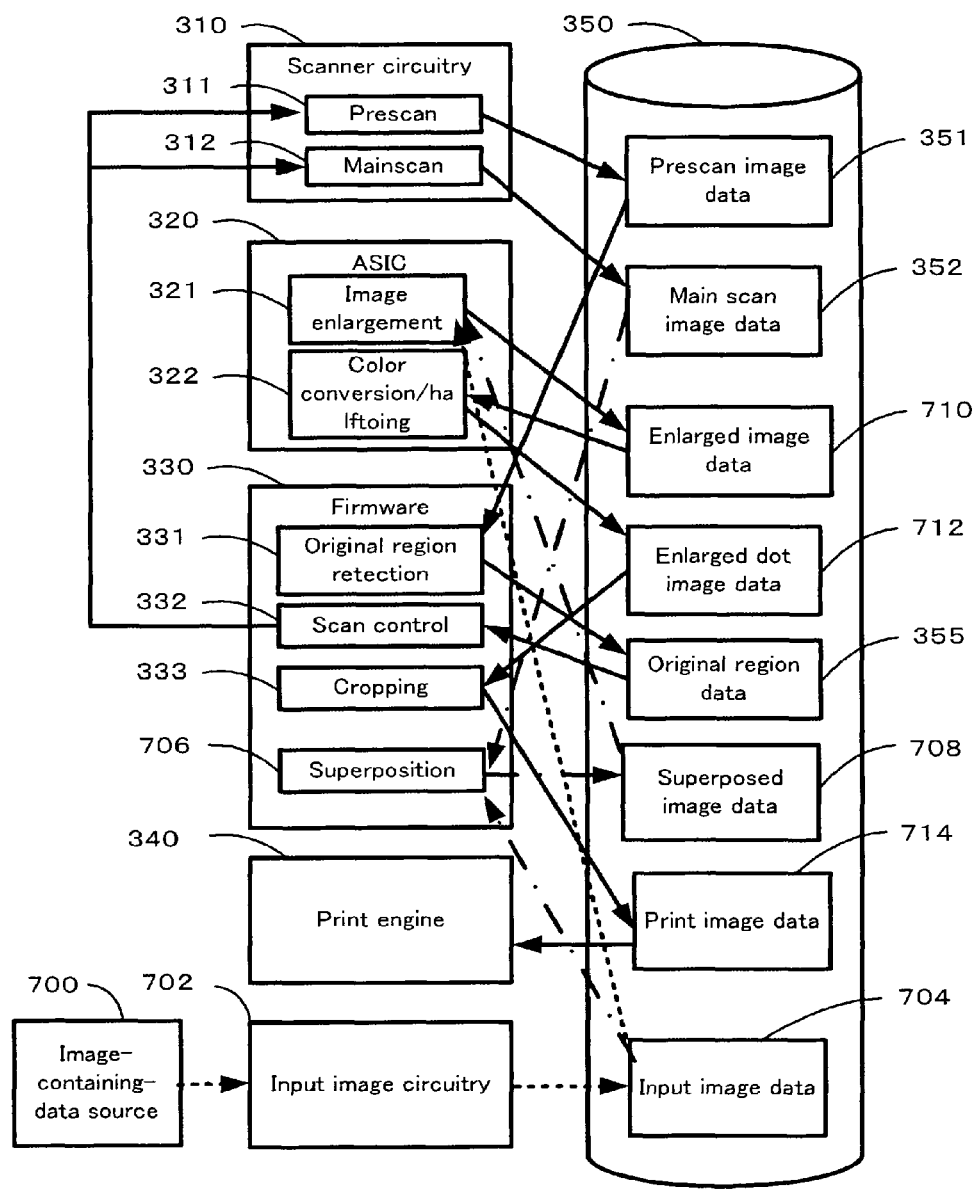
FIG. 25 is a block diagram showing the constitution of a variation on a hybrid printer associated with the fourth embodiment.

FIG. 25 shows a variation on the foregoing fourth embodiment in which borderless print mode and superposed print mode functionalities have been added.

When operations are carried out in accordance with borderless print mode, image input circuitry 702 of the hybrid printer might accept input of image data 704 from image-containing-data source 700 as indicated by the arrows drawn with dashed lines in FIG. 25. Image enlargement processing 321 is carried out on this input image data 704, as a result of which input image data 704 (or region(s) subject to printing therewithin) is enlarged so as to be a size slightly larger than the printing paper, producing enlarged image data 710. Enlarged image data 710 is thereafter converted to print image data 714 in accordance with a procedure similar to that which has already been described with reference to borderless copy mode(s), and four-sided or two-sided borderless printing is carried out.

When operations are carried out in accordance with superposed print mode, image input circuitry 702 of the hybrid printer might accept input of image data 704 from image-containing-data source 700 as indicated by the arrows drawn with alternating long and short dashed lines in FIG. 25. Moreover, superposition processing 706 is carried out, input image data 704 (or region(s) subject to printing therewithin) from image input circuitry 702 and main scan image data 352 (or copy subject region(s) therewithin) from scanner circuitry 310 being superposed, producing superposed image data 708. Image enlargement processing 321 is carried out on this superposed image data 708, as a result of which either or both of main scan image data 352 (or copy subject region(s) therewithin) and input image data 704 (or region(s) subject to printing therewithin) contained within superposed image data 708 is/are enlarged so as to be size(s) slightly larger than the printing paper, converting superposed image data 708 into enlarged image data 710. For example, where input image data 704 or main scan image data 352 is a photographic image and the other is the image of a border decoration which is to be applied to the edges at the four sides of that photographic image, the two might be superposed so as to produce superposed image data 708 either without enlargement of the photographic image (either preserving the initial size thereof or reducing same as necessary) and/or with enlargement of only the border decoration image such that it is slightly larger than the printing paper. Alternatively, in superposing the two to produce superposed image data 708, the photographic image and the border decoration image might both be enlarged so as to be slightly larger than the printing paper. In the context of the foregoing, selection of which (if any) among a plurality of images to be superposed is/are to be enlarged and/or which (if any) thereamong is/are not to be enlarged (and/or is/are to be reduced) may be performed by user(s) and/or may be performed automatically by the hybrid printer. Enlarged image data 710 is thereafter converted to print image data 714 in accordance with a procedure similar to that which has already been described with reference to borderless copy mode(s), and four-sided or two-sided borderless printing is carried out.

Whereas a number of preferred embodiments of the present invention have been described above, these have been presented as examples for purposes of describing the present invention and without intent to limit the scope of the present invention to these embodiments alone. The present invention may be carried out in the context of a wide variety of other modes and embodiments. For example, the present invention may be applied to a facsimile communication system in which original(s) is/are scanned by facsimile transmitter(s) and the scan image data is sent to facsimile receiver(s), facsimile receiver(s) using such scan image data to carry out four-sided and/or two-sided borderless printing.

In the foregoing embodiments, one scan region was established at original stage(s). However, in variations thereof, a plurality of scan regions may be established at original stage(s). For example, where a single original contains a plurality of photographic images, a plurality of scan regions might respectively be established in correspondence to such plurality of photographic images. Or where a film scanner for scanning photographic filmstrips (originals) containing series of photographs in the form of photographic frames is employed, a plurality of scan regions might respectively be established in correspondence to a plurality of photographic frames within a single photographic filmstrip. Or where a duplex scanner for scanning images on the two sides, i.e., front and back, of a single original is employed, at least two scan regions might respectively be established in correspondence to the two sides of the original. Moreover, image processing for carrying out four-sided and/or two-sided borderless copying in accordance with the principles of the present invention may be applied to each of such plurality of scan regions.

Furthermore, the foregoing embodiments may employ flatbed-type image scanner(s) having flat original stage(s). However, variations thereon may employ other type(s) of image scanner(s); e.g., drum-type image scanner(s) having rotatable drum-shaped original stage(s); automatic-sheet-feeder-type image scanner(s) having strip-like original stage(s) and automatic sheet feeder(s), scanning being carried out by causing original sheet(s) to move over original stage(s) by means of automatic sheet feeder(s); portable-type scanner(s) possessing compact body or bodies having strip-like original stage(s) at outer surface(s) thereof, scanning being carried out when original stage(s) of body or bodies held by user(s) is/are moved as if to wipe original sheet(s) therewith; and so forth.

Further, the present invention is not only applicable to four-sided or two-sided borderless copying as described above, but also applicable to one-sided or three-sided borderless copying.

What is claimed is:

1. A copy system comprising:
   a scanner configured to scan an image and configured to generate image data;
   an image processor configured to process image data generated by the scanner; and
   a printer configured to print on a print medium based on data processed by the image processor;
   wherein the scanner is configured to generate image data of a first region which is located on an inside of an edge of an original region, the first region being separated from the inside edge by a scanner margin;
   wherein the image processor is configured to generate print data by processing the image data of the first region generated by the scanner;
   wherein the printer is configured to print based on the print data;
   wherein the image processor is configured to generate first print data at a first magnification, thereby executing a first copy with an edge portion of the first print data being out of the print medium;
   wherein the image processor is configured to generate second print data at a second magnification, thereby executing a second copy with the edge portion of the second print data being inside of the print medium; and
   wherein the first magnification exceeds the second magnification.

2. A copy system according to claim 1, wherein a width of an overextending portion that overextends from the edge portion of the first print data is a print margin; and
   wherein the scanner margin is smaller than the printer margin.

3. A copy system according to claim 1, wherein the scanner, the image processor and the printer are disposed in an enclosure of an apparatus.

4. A copy system comprising:
   a scanner configured to scan based on an original region and configured to generate image data;
   an image processor configured to generate first print data by processing image data at a first magnification and configured to generate second print data by processing image data at a second magnification; and
   a printer configured to print on a print medium based on first print data with an edge portion of the original region being out of the print medium and configured to print on a print medium based on second print data with the edge portion of the original region being inside of the print medium;
   wherein the first magnification exceeds the second magnification.

5. A copy system according to claim 4, wherein the scanner is configured to scan a region which is located on an inside of the original region by a scanner margin;
   wherein if the printer prints based on the first print data, then a width of an overextending portion that overextends from the edge portion is a print margin; and
   wherein the scanner margin is smaller than the printer margin.

6. A copy system according to claim 4, wherein the scanner, the image processor and the printer are disposed in an enclosure of an apparatus.

7. A copy method, comprising:
   scanning an image by a scanner;
   generating, by the scanner, image data of a first region, which is located on an inside of an edge of an original region, the first region being separated from the inside edge by a scanner margin;
   generating, by an image processor, print data by processing the image data of the first region generated by the scanner;
   printing, by a printer, on a print medium using the print data;
   wherein first print data is generated at a first magnification, thereby executing a first copy with an edge portion of the first print data being out of the print medium;

wherein second print data is generated at a second magnification, thereby executing a second copy with the edge portion of the second print data being inside of the print medium; and wherein the first magnification exceeds the second magnification.

* * * * *